United States Patent [19]

Vincent et al.

[11] Patent Number: 4,870,268

[45] Date of Patent: Sep. 26, 1989

[54] COLOR COMBINER AND SEPARATOR AND IMPLEMENTATIONS

[75] Inventors: Kent D. Vincent, Cupertino; Hans D. Neumann, Los Altos, both of Calif.

[73] Assignee: Hewlett-Packard Company, Palo Alto, Calif.

[21] Appl. No.: 333,850

[22] Filed: Apr. 4, 1989

Related U.S. Application Data

[63] Continuation of Ser. No. 145,174, Jan. 19, 1988, abandoned, which is a continuation-in-part of Ser. No. 124,225, Nov. 23, 1987, which is a continuation of Ser. No. 847,382, Apr. 2, 1986, Pat. No. 4,709,144.

[51] Int. Cl.⁴ .................................................. G01J 3/50
[52] U.S. Cl. ...................................... 250/226; 350/166
[58] Field of Search ................ 250/226, 578; 350/166, 350/169, 170, 171, 173; 358/49; 340/748, 785, 786, 787

[56] References Cited

U.S. PATENT DOCUMENTS 4,709,144  11/1987  Vincent ................................ 250/226

Primary Examiner—David C. Nelms
Assistant Examiner—William L. Oen
Attorney, Agent, or Firm—William W. Cochran, II

[57] ABSTRACT

The trichromatic beamsplitter consists of composited dichroic beamsplitter plates that separate a projected image into its three color components with spatial as well as spectral precision. The three linear array photosensor comprises a monolithic sensor having three parallel photodiode arrays spaced precisely to accept the color component images of the trichromatic beamsplitter.

The present invention also employs a spectral and spatial combiner that is capable of maintaining equal optical path lengths of each spectral beam so that a single combined beam can be produced and can be employed in a number of different applications such as a color camera device, a color recording device, a graphics presentation device, an electronic color filter device, a color projector device and a multi-channel optical communication device.

48 Claims, 22 Drawing Sheets

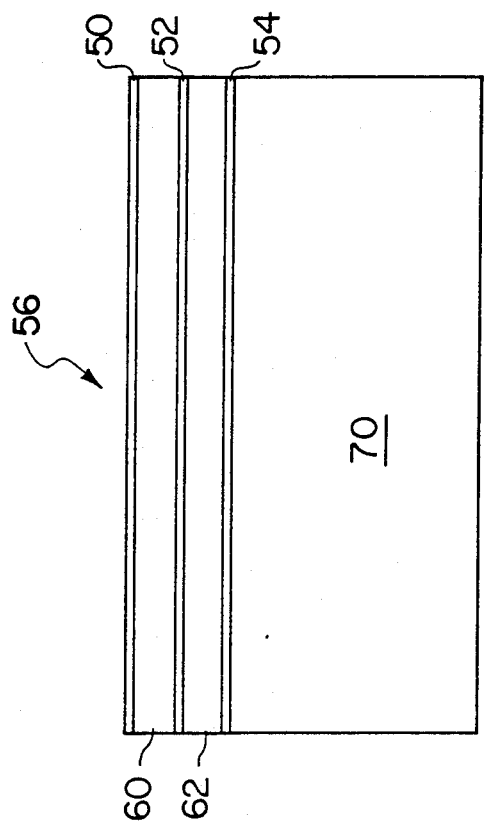
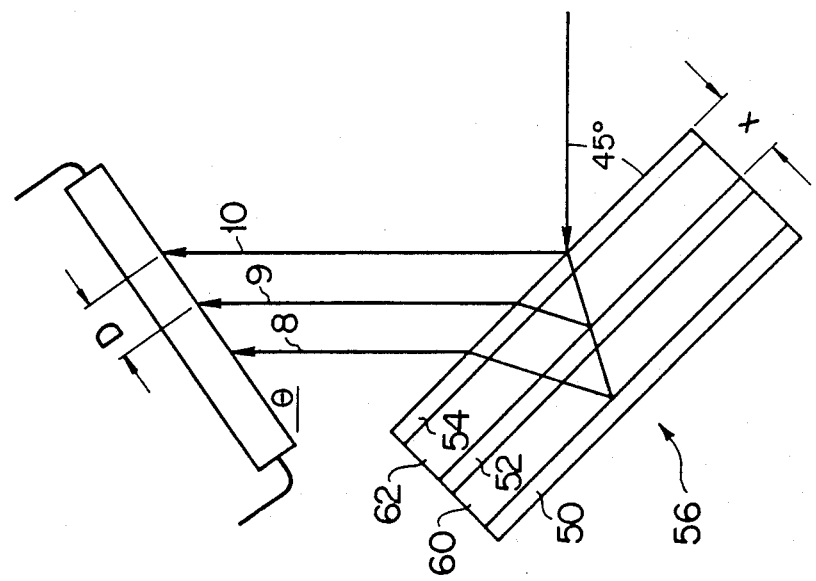
FIG 8
FIG 7

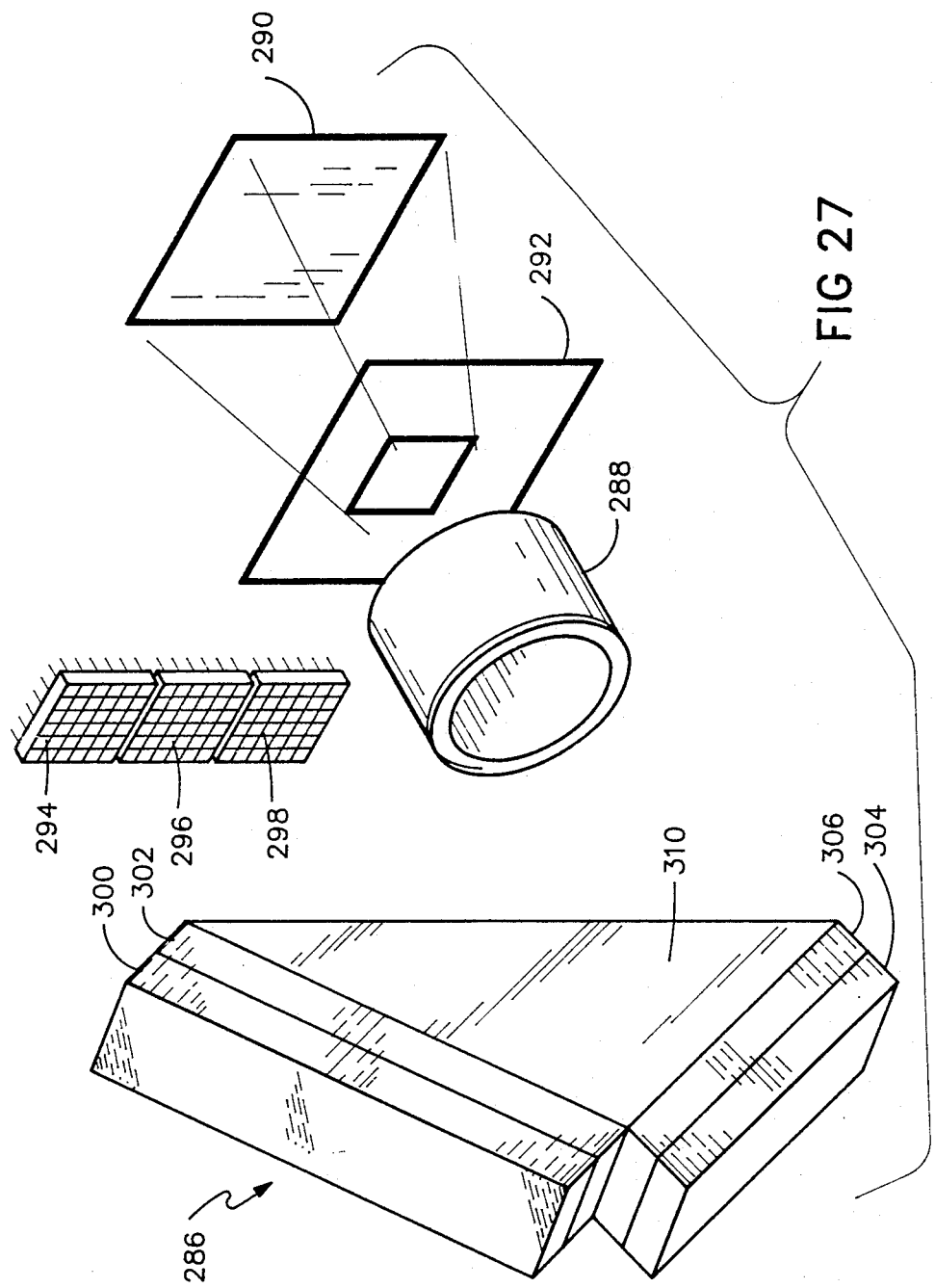

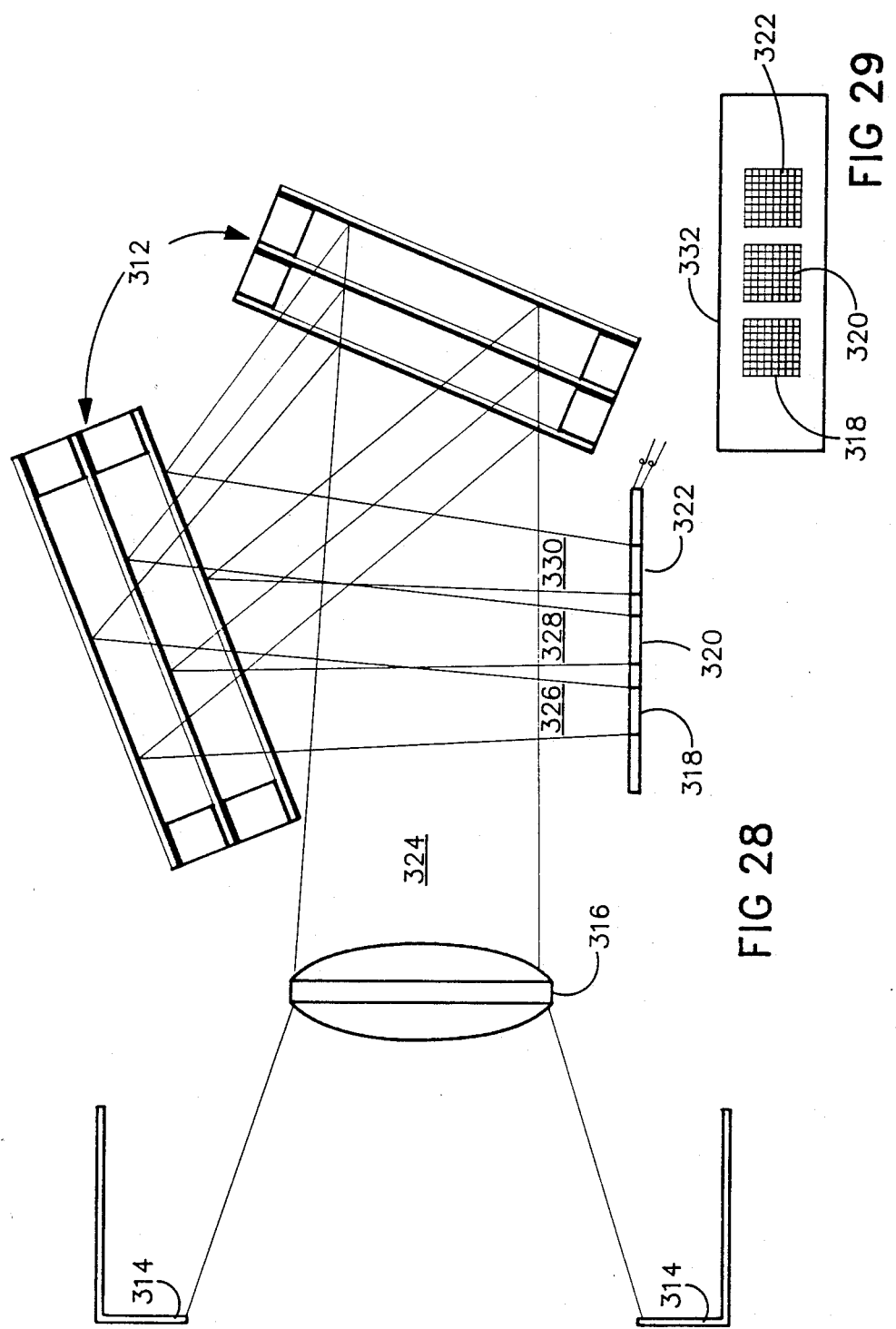

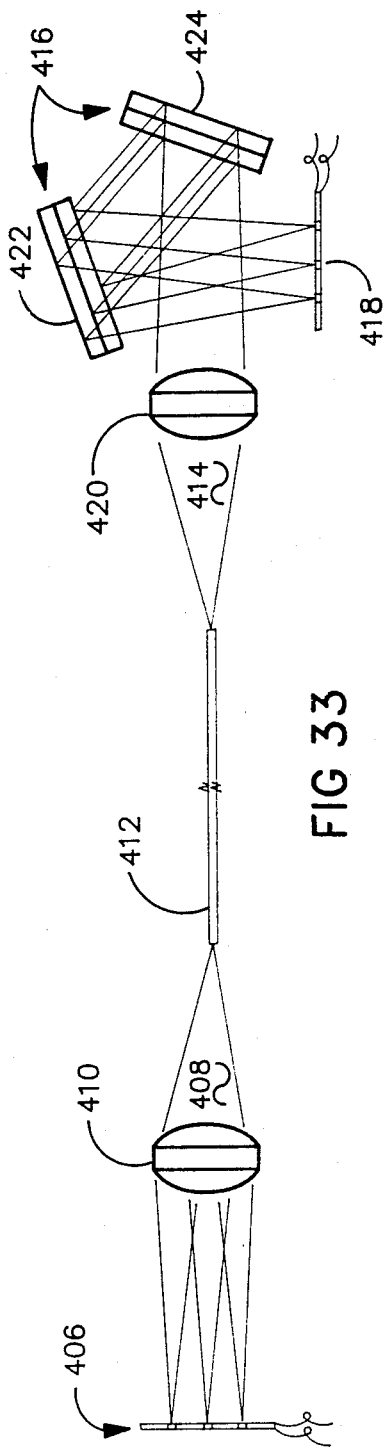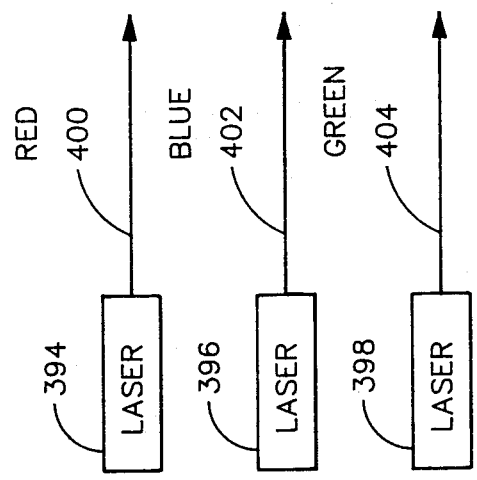

COLOR COMBINER AND SEPARATOR AND IMPLEMENTATIONS

CROSS REFERENCE TO RELATED APPLICATIONS

This application is a continuation of Ser. No. 145,174 filed Jan 19, 1988, now abandoned, which is a continuation-in-part application of Ser. No. 124,225 filed Nov. 23, 1987 which, in turn, is a continuation application of Ser. No. 847,382 filed Apr. 2, 1986, now U.S. Pat. No. 4,709,144 issued Nov. 24, 1987.

BACKGROUND OF THE INVENTION

A. Field of Invention

The present invention pertains generally to optics and more specifically to color separators, color combiners and inventions utilizing color separators and color combiners.

B. Description Of The Background

Color imagers include color video cameras and color scanners for commercial printing. Color imagers transform color pictures into machine readable data. This is accomplished by dividing a color image into many small portions called pixels. The color imager separates light from each pixel into red, blue or green light. Numbers assigned to each pixel of the color image represent the red, blue, and green light. A fast, high resolution, accurate color imager would enhance the usefulness of computers and automate numerous tasks. For example, computers can print and display color images. However, the lack of fast, accurate, and high resolution means for transferring color images into a computer limits the use of this capability. In the early prior art, discrete optical components, such as beamsplitters and color filters, separate the color components of an image. Dichroic beamsplitters have been widely used due to the combined functions of these devices as both beamsplitters and filters. Dichroic beamsplitters employ selected multilayer dielectric interference optical filter coatings, hereinafter referred to as dichroic coatings. Typically, color separation is achieved by placing two discrete dichroic beamsplitters in the optical pathway between the projection lens of the imager and its photosensors. The first dichroic beamsplitter reflects a first spectral band (e.g., green) to the first photosensor while transmitting the remaining spectral bands to the second dichroic beamsplitter. The second dichroic beamsplitter reflects a second band (e.g., red) to a second photosensor while transmitting the remaining spectral band (e.g., blue) to the third photosensor. The disadvantage of this approach is that the respective dichroic beamsplitters and photosensors must be precisely aligned; otherwise, the color components will not have the proper optical coincidence. The costly alignment process limits the use of this prior art color separator. Dichroic beamsplitters (dichroic prism), as well as other prior art techniques of color scanning are described more fully in a Japanese article entitled "Image Scanners," OEP November 1986, pp. 18-22. As disclosed therein, the dichroic prism requires each sensor to be placed on a different plane.

With the advent of low-cost, solid-state photodiode array photosensors, various attempts have been made to develop low cost color separation techniques for color scanners and video cameras.

Solid-state, photodiode arrays with integral color filters have been commercialized by Hitachi, Toshiba, Sony and RCA. These devices employ a two-dimensional array of photodiodes on a single silicon substrate. The array is coated with a gelatin layer, into which color dyes are selectively impregnated, using standard masking techniques. Each photodiode is, thus, given an integral color filter, e.g., red, green or blue, according to a color pattern which is repeated throughout the array. The same technology has been applied to one-dimensional photodiode array sensors for line scanners. The latter devices have been commercialized by Toshiba and Fairchild.

A prior art color imager using photodiode arrays is shown in FIG. 1. The single linear photodiode array 23 has individual organic dye filters impregnated over each photodiode in a repetitive red, blue and green pattern. Color separation, the breaking down of a color image into red, blue and green light, is achieved by focusing the light beam on the array, as shown in FIG. 1. One red, green and blue photodiode grouping 25 provides information to one color pixel. This prior art technique has several disadvantages. Since three photodiodes supply information to one pixel, the pixel resolution is reduced to one-third. For accurate color imaging, the luminance detail and chroma of a given color pixel from the original image must be resolved by three optically coincidental photosensor elements. However, the prior art photodiode arrays do not have color-coincidence. The red light is detected from one location, green from another, and blue from a third location. In addition, two-thirds of the light incident on each photodiode is lost by filler absorption (e.g., a red filter absorbs green and blue spectral bands). In order to increase the resolution, the array 23 must be lengthened or the photodiode area must be decreased. However, either of these approaches to increase the resolution will proportionately decrease scan speed. Also, the dye filters have less color band purity than dichroic filters. The prior art approach desaturates color sensitivity and is otherwise spectrally inaccurate.

Another prior art color imager using photodiode arrays has a rotating color wheel composed of colored filter segments. The lens focuses a line image of the original object on a linear photodiode array. The rotating color wheel filters the projected line image in a repeating color sequence, e.g., red, green, blue. The signal for each color component of a given line image is stored digitally until all three color components have been detected. The signals ar then reordered in memory to assign three color values to each pixel in the line image.

The color wheel color separation technique has the advantages of utilizing the full resolution of the photodiode array as well as utilizing dichroic filters. However, it has several disadvantages. The scan speed is one-third of the integral sensor/filter scan speed, since only one of three colors is detected at a time. Also, further speed reduction results from transitions between filter segments during rotation of the wheel. When the color wheel and scan line are continuously driven, as opposed to synchronously "stepped", the effective resolution of the photodiode array is diminished in the scan direction by the movement of the scan line through the color cycle of the color wheel. Another disadvantage is the size of the color wheel which limits device extensibility. Page-width "contact" or "traversing head" type scanner embodiments become impossible or unwieldy.

Further, this prior art device is burdened with a large moving mechanism and the control of this mechanism.

The Sharp Corporation of Japan has introduced a third prior art color separation technique for color document scanning. The Sharp scanner employs a single photodiode array with three sequentially-fired colored fluorescent lamps (e.g., red, green, blue), as the imaging light source. The sequence of signals obtained by the photodiode array is directly analogous to the color wheel color separator. That is, the input to the photodiode array is a sequential input of the red, green and blue components of a given original line image. Likewise, the photodiode signals for each color component are digitally stored and reordered in memory at the end of each color cycle.

Like the color wheel color separator, the tricolored lamp approach provides imaging means that utilize the full resolution of the photodiode array. Several shortcomings, however, limit the speed and color integrity of the imager. In order to obtain correct color separation, the light output from each lamp should be extinguised before the firing of the next lamp in sequence; blended lamp output produces undersaturated color detection. Scanning speed, as a result, is limited by the persistence time of the phosphors utilized in each fluorescent lamp or the ability to dynamically subtract out the signal produced by the decaying light output of a previously fired lamp. Color integrity is further limited by the selection of phosphors having persistence values sufficiently low to meet commercial scan speed specifications. Typically, external absorption filtering of the lamps is required to obtain the desired spectral characteristics or each lamp output. As with the color wheel color separator, when the scan line is continuously driven, as is desirable for scan speed, the effective resolution of the photodiode array is diminished in the scan direction by the movement of the can line through the color cycle of the sequentially-fired lamps. The size and bulk of the optical system comprising the three lamps likewise restricts device extensibility toward "contact" or "traversing head" type scanner applications.

Color combiner devices suffer from many of the same disadvantages and limitations as the color separators set forth above. A color combiner, as defined herein, comprises an optical device for taking individual color components and spatially and spectrally combining each of the individual beams into a single optical beam wherein each of the individual color component beams have coincident optical axes. The prior art does not disclose any device that is capable of combining individual spectral beams, as described, in a simple and easy manner.

SUMMARY OF THE INVENTION

The present invention overcomes the disadvantages and limitations of the prior art by providing an optical device for spatially and spectrally combining a plurality of substantially parallel optical beams such that the optical axes of each of the plurality of optical beams are coincident and form a single combined beam and the optical path lengths of each of the individual optical beams is substantially equal. The present invention is also capable of spatially and spectrally combining beams that allows imaging from a single object plane to a single image plane.

The present invention also comprises a optical color imaging device for generating a color image on an image plane in response to an electronic imaging signal using an optical device for spatially and spectrally combining a plurality of optical beams having different spectral ranges and spatially separated optical axes to form a single combined beam with coincident optical axes. The optical color imaging device can be utilized for projecting a video image, recording a document scan signal, or other similar applications of an imaging device.

The present invention can also comprise a color image detector device for generating a color electronic image signal representative of a color image formed from an image beam focused on an image plane by using a spectral separator for spatially and spectrally separating the color image beam into a plurality of optical beams that have predetermined spectral ranges and substantially equal optical path lengths.

The present invention may also comprise an electronic color filter device that uses a spectral separator for spatially and spectrally separating an input optical beam into a plurality of individual color beams that are spectrally and spatially separated. An aperture device can be used to control the intensity of each of the color beams.

The present invention may also comprise an electronic color filter that uses a spectral combiner to combine a plurality of color beams from a spectral separator, or a plurality of sources of color beams, into a single combined output beam. The combiner can be designed such that the optical axes of each of the color beams have substantially equal optical path lengths and are substantially aligned with a single optical axis.

The present invention may also comprise a multiple channel fiber optic communication device that is capable of transmitting multiple channels on a single fiber optic by using a plurality of optical beams having different spectral ranges that are combined for transmission through the fiber optic and are separated after transmission through the fiber optic.

An advantage of the present invention is that the spectral separator and combiner optical components are compact, inexpensive and easy to manufacture. Another advantage of the present invention is that the optical components produce color coincidence within a pixel. That is, each portion of a pixel generates all three color components so as to provide exact color convergence and line acuity. The invention also provides accurate spectral and spatial separation as well as accurate spectral and spatial combination.

The optical combiner and optical separator components of the present invention are also extremely efficient in comparison to conventional filtration techniques since dichroic reflective layers are used. Essentially all of the incident light striking the components is transmitted with very little absorption. A conventional filter typically absorbs two spectral bands to transmit one. Since essentially all of the visible light is utilized, maximum speed is achievable for a given optical system.

Additionally, the optical components of the present invention do not require costly optical alignment. The dichroic coatings are precisely separated by glass plates and/or precise separator devices in the manufacturing process. This separation is determined by considering the refractive indices of the substances used in the optical separator and combiner components as well as the angles of incidence to provide a very precise alignment. The optical separator and combiner components provide equal optical path lengths for each of the individual beams with minimal alignment problems.

Also, since the present invention uses substantially parallel, spatially separated, spectral beams for both the combiner and separator optical components, a single object and image plane are employed in accordance with the present invention.

BRIEF DESCRIPTION OF THE DRAWINGS

FIG. 7 shows the trichromatic photosensor shown in FIG. 5 positioned to detect light beams from the trichromatic beamsplitter shown in FIG. 4.

FIG. 8 shows a construction means for the trichromatic beamsplitter.

FIG. 27 is a schematic isometric view of both a color imaging and a color projection device.

FIG. 28 is a schematic side view of a color imaging device.

FIG. 29 is a schematic plan view illustrating three matrices of photo detectors.

FIG. 32 is a schematic representation of the use of three color lasers as an optical source.

FIG. 33 is a schematic side view of another embodiment of the multiple channel fiber optic communication device.

DETAILED DESCRIPTION OF THE INVENTION

Figure 2:
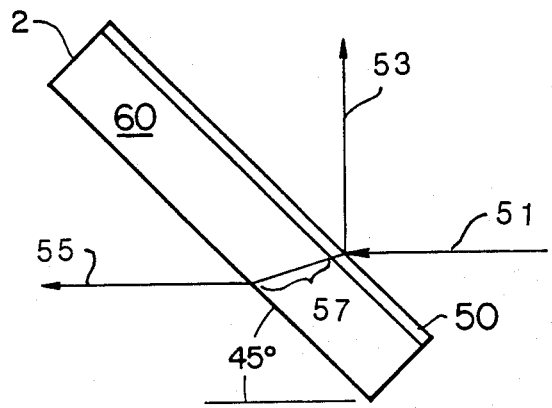
FIGS. 2 and 3 show dichroic beamsplitter plates.

FIG. 2 illustrates a single layer dichroic optical component that comprises a substantially transparent optical support medium 60, such as a glass plate, that is optically flat and a dichroic layer 50 that is deposited on one side of the glass plate 60. As shown in FIG. 2, an input optical beam 51 is split into two spatially and spectrally separated optical beams 53 and 55. Dichroic layer 50 reflects optical radiation having a predetermined wavelength and transmits all other radiation along optical beam 55. Because the index of refraction of air is different than the index of refraction of glass, the portion 57 of optical beam 55 is refracted at a different angle through the glass plate 60.

Figure 3:
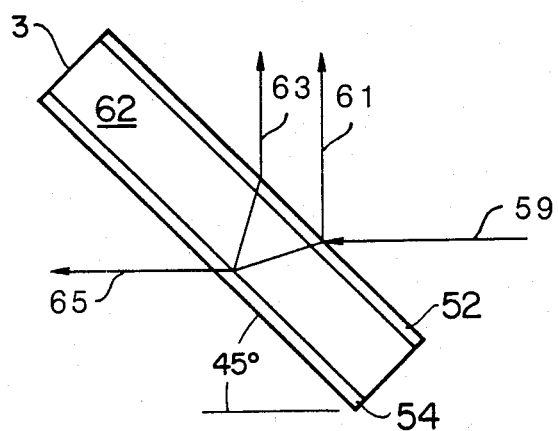

FIG. 3 illustrates the manner in which a glass plate 62 can be coated on two sides with two dichroic layers 52 and 54 to split an incoming beam 59 into three spatially and spectrally separated beams 61, 63, 65. Optical beams 61 and 63 are transmitted in parallel directions as a result of the parallel faces of substantially transparent optical support medium 62.

Figure 4:
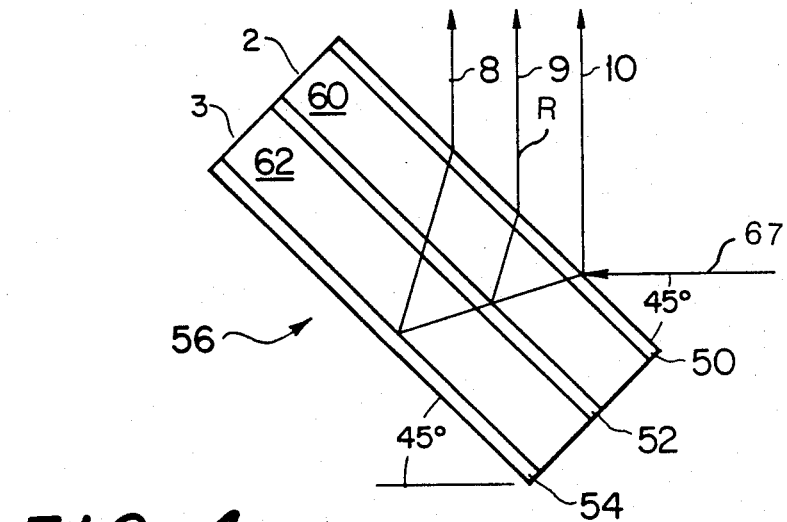
FIG. 4 shows a trichromatic beamsplitter made from the dichroic beamsplitter plates shown in FIGS. 2 and 2B.

FIG. 4 illustrates the manner in which two optically flat transparent optical support media 60 and 62 can be attached to provide three substantially equally spaced dichroic layers to produce three substantially parallel optical beams 8, 9, 10 that are both spatially and spectrally separated. In accordance with the present invention, precise spectral and spatial separation of a projected line image is achieved through composited dichroic beamsplitters, as shown in FIG. 4. The optical separator 56 consists of precisely ground and polished glass plates 60 and 62 coated on one or both faces with dichroic coatings 50, 52, and 54. At each dichroic coating 50, 52, and 54, incident light is either reflected or transmitted according to wavelength with negligible absorption loss. The composition of the dichroic coatings 50, 52, and 54 can be designed for accurate bandpass filtration.

Dichroic coatings are well known in the art of optics. Dichroic coatings typically consist of 20 or more alternating high and low refractive index optical layers vacuum-deposited to an accumulative thickness of, typically, about one to three microns on a glass surface. The material composition and method of deposition can be designed for very accurate spectral bandpass filtration. A variety of dichroic filters, consisting of a single glass plate front surface coated with a dichroic coating, are commercially available from a variety of sources (e.g., Optical Coating Laboratory, Inc., located in Santa Rosa, Calif.).

The plate 2, shown in FIG. 4, is designed such that incident light striking dichroic coating 50 at 45 degrees reflects blue light (approximately 400-500 nm.) while transmitting red light and green light.

Plate 3, shown in FIG. 4, is coated on both faces with dichroic coatings 52 and 54 such that incident light striking a first dichroic coating 52 at nominally 45 degree reflects the red spectral band (e.g., 600-700 nm.) while transmitting the green band. The green light striking a second dichroic coating 54 and having an optical axis oriented nominally 45 degrees from the dichroic coating is reflected. The reflected green light is caused to pass back through the glass plate 62 and through the other dichroic coatings 52 and 50 at a 45 degrees angle. As shown in FIG. 4, each of the components 8, 9 and 10 of the incident light are reflected at 90 degrees to incoming beam 67. The reflected red and green components 9 and 8 are parallel and separated from each other by a distance determined by the glass plate 62 and dichroic coating thickness 54, the plate 62, and the angle of incidence. Similarly, the blue and red components 10 and 9 are separated by a distance determined by the thickness of glass plate 60, dichroic coating 50, the index of refraction of the plate 60 and the angle of incidence.

A trichromatic separation of an incident light beam can be achieved through a composite of beamsplitter plates 2 and 3, as shown in FIG. 4. Each of the three spectrally-tailored dichroic coatings 50, 52, and 54, are separated by the thickness of glass plates 60, 62. Incident light striking the first dichroic coating, and having, for example, an angle of incidence of 45 degrees from the dichroic coating, is filtered such that the blue spectral band is reflected. The unreflected bands (red and green) are transmitted to a second dichroic coating 52 located between the glass plates 60 and 62. Coating 52 reflects the red spectral band. The remaining band, i.e., the green spectral band, is reflected from the third dichroic coating 54. The red and green spectral components exit the composite beamsplitter 56 through the glass plates 60 and 62 and dichroic coatings 50 and 52, essentially unperturbed. Thus separated, red, green, and blue components of the incident light beam are reflected at 90 degrees to the principal incident beam with a parallel spatial separation which is solely determined by the thickness of the glass plates 60, 62, and dichroic coatings 50, 52, and 54, and the refractive indices thereof. The order in which the reflected color bands have been presented is by example only. It is further obvious that a mirror coating could be substituted for the third dichroic coating 54, since only the third remaining color component reaches that coating interface.

Figure 5:
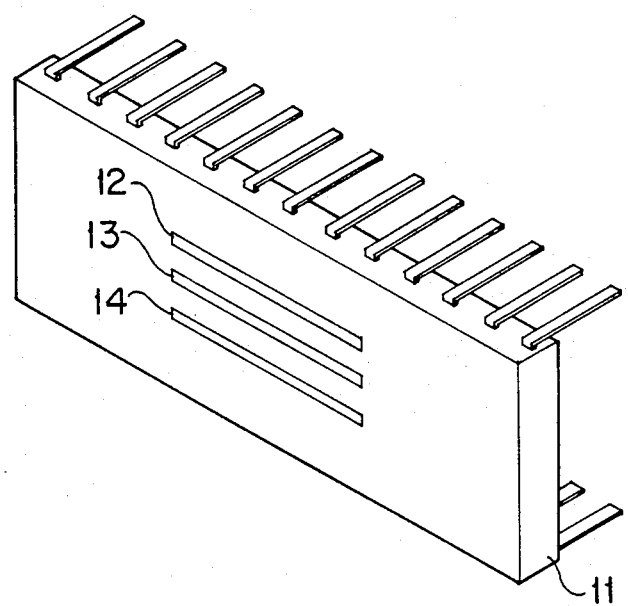
FIGS. 5 and 6 show the photosensor integrated circuit and photosensor arrays, respectively, used to detect light beams from the trichromatic beamsplitter shown in FIG. 3.

A suitable photosensor for use with this invention is shown in FIG. 5. Photosensor 11 is preferably a single chip, single package solid state device having three linear photosensor arrays, 12, 13 and 14, precisely aligned and spaced to coincide with the focused line images 8, 9 and 10, respectively, shown in FIGS. 4 and 7. Such devices can be made using known technologies. For example, numerous photosensor array devices are now commercially available. Most prominent are photodiode arrays with charge-coupled shift registers (CCD photosensors). Such single line CCD photodiode array devices are commercially available from Fairchild Semiconductor, located in Palo Alto, Calif., Toshiba, located in Japan, and other companies. The photosensor array devices have commercial resolutions ranging from 128 to over 5000 photoelements per line. The spacing between photoelements typically ranges from 10 to 62 microns. Thus, the design and manufacture of a photodiode array shown in FIG. 5 uses known technologies to produce the three parallel photosensor arrays 12, 13 and 14.

Figure 6:
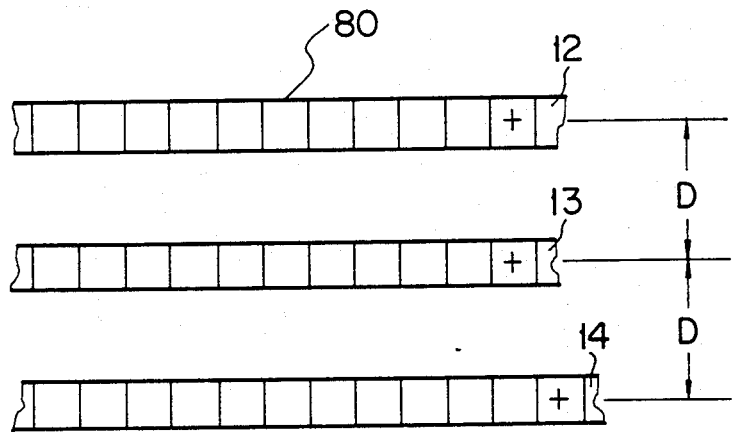

As illustrated in FIG. 6, a distance "D" separates the photosensor arrays 12, 13, and 14. As shown in FIG. 7, the distance "D" is related to the séparation of the dichroic coatings 50, 52, and 54, and angle theta of the photosensor 11. The distance between photosensors 12 and 13 does not have to be equal to the distance between photosensors 13 and 14. The three photosensor arrays 12, 13, and 14 have common clock inputs for synchronization. As is well known in the art, integrated circuit photolithography processes are capable of aligning and spacing the three linear photosensor arrays 12, 13 and 14 to submicron precision. The combined spatial precision of the described trichromatic beamsplitter 56 and three photosensor array detectors, 12, 13 and 14, allows accurate coincidence of the detected images with the single line image of the original.

The preferred arrangement of trichromatic beamsplitter 56 and photosensor 11 is shown in an end view in FIG. 7. Due to the variations in path-length-through-glass between the three separated color components, beamsplitter 56 and photosensor 11 are mounted to have an inclusive angle less than 90 degrees, typically 80 degrees for nominal glass refractive index. The inclusive angle is independent of the focal distance between the lens and photosensor. At the inclusive angle, the three separated color components will properly focus on each respective linear photosensor array 12, 13 and 14. The spatial separation of arrays 12, 13, and 14 is directly determined by the thickness of the glass plates 60 and 62, dichroic coatings 50, 52, and 54, and the refractive indexes of the optical support medium 60 and 62. (Standard lens formulas are used to calculate the angle and separation distances.) Trichromatic beamsplitter 56 and photosensor 11 are preferably assembled in a housing that maintains the desired angles and distances, and that consolidates the parts into a single package.

As is well known in optics, a focused light beam transmitted through as glass plate at an angle of incidence other than 90 degrees is subject to oblique spherical aberration. This causes astigmatism. Increasing glass thickness and angle of incidence exacerbate the astigmatism. The red, blue, and green spectral components experience different degrees of degradation due to their different path length through the glass and the high angle of incidence (45 degrees). This compromises the focus and resolution of the color separation technique to the extent that the chromatic foci through the trichromatic beamsplitter occur beyond the depth of focus provided by the imaging lens.

In the preferred embodiment, the thickness of the glass plates 60 and 62 and dichroic coatings 50, 52, and 54, and the spatial separation of the three photosensor arrays 12, 13, and 14, in photosensor 11 are collectively minimized to render negligible the otherwise optical deficiencies and minimize cost. Since thin glass plates (on the order of 0.1 to 0.2 millimeter) are difficult to grind and coat without substantial warpage, a preferred method of beamsplitter manufacture will include a thick glass substrate 70, shown in FIG. 8, from which the trichromatic beamsplitter 56 is built up. In this preferred method, the thick glass substrate 70 is ground flat, polished and coated with dichroic coating 54. Glass plate 62 is bonded using an optical cement. The exposed surface of glass plate 62 is then ground flat and polished to provide the desired thickness of coating, cement and glass as measured through the composite. In a like manner, glass plate 62 is coated with dichroic coating 52, then bonded to glass plate 60, at which point the surface of plate 60 is ground and polished to the desired thickness. Finally, dichroic coating 50 is deposited on the exposed surface of plate 60. Using said fabrication method, trichromatic beamsplitter 56 can be manufactured from relatively large glass sheets from which many beamsplitters may be cut at minimum part cost.

Figure 9:
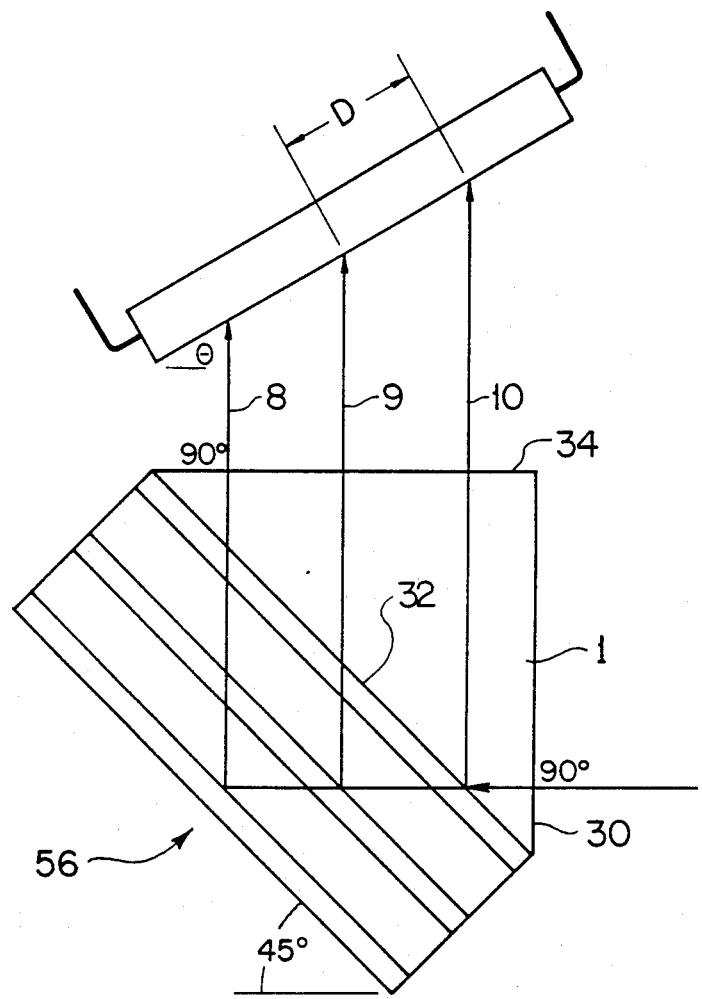
FIG. 9 shows an alternate embodiment of the trichromatic beamsplitter shown in FIG. 7 with a prism attached.

An alternate embodiment utilizes a single pair of beamsplitter plates and a single prism. As shown in FIG. 9, the incident light beam is aligned to impinge a first base side 30 of right-angle prism 1 at a normal angle and transmit therein to the hypotenuse face 32 of the prism 1 which the light beam impinges at 45 degrees. The composite beamsplitter 56 of FIG. 4, consisting of beamsplitters 2 and 3, is attached thereto. A trichromatic separation of the red, green and blue spectral components of the incident light beam occurs as previously described. The three reflected component beams re-enter the prism 1 and are directed toward the second base side 34 of the prism. The component beams exit the prism at 90 degrees to its base side 34 and with an optical axis spatial separation (SQRT 2)x where x is the thickness of the glass, optical cement and dichroic coating between two adjacent dichroic coatings. Irrespective of the lens used to focus through beamsplitter 56, the three component light beams will focus on a plane oriented at an angle theta=arctan 2 (n−1/n) to the second base side 34 of prism 1, where n is the refractive index of the glass prism 1 and beamsplitter plates (for n=1.517, theta=34.28 degrees). The three linear array photosensors 12, 13, and 14, as previously described, are aligned on said plane at angle theta at the location of foci of the three component beams. Trichromatic beamsplitter 56 with the prism 1 allows a 90 degree angle of incidence to glass and chromatic focusing to each sensor array 12, 13, and 14.

Figure 10:
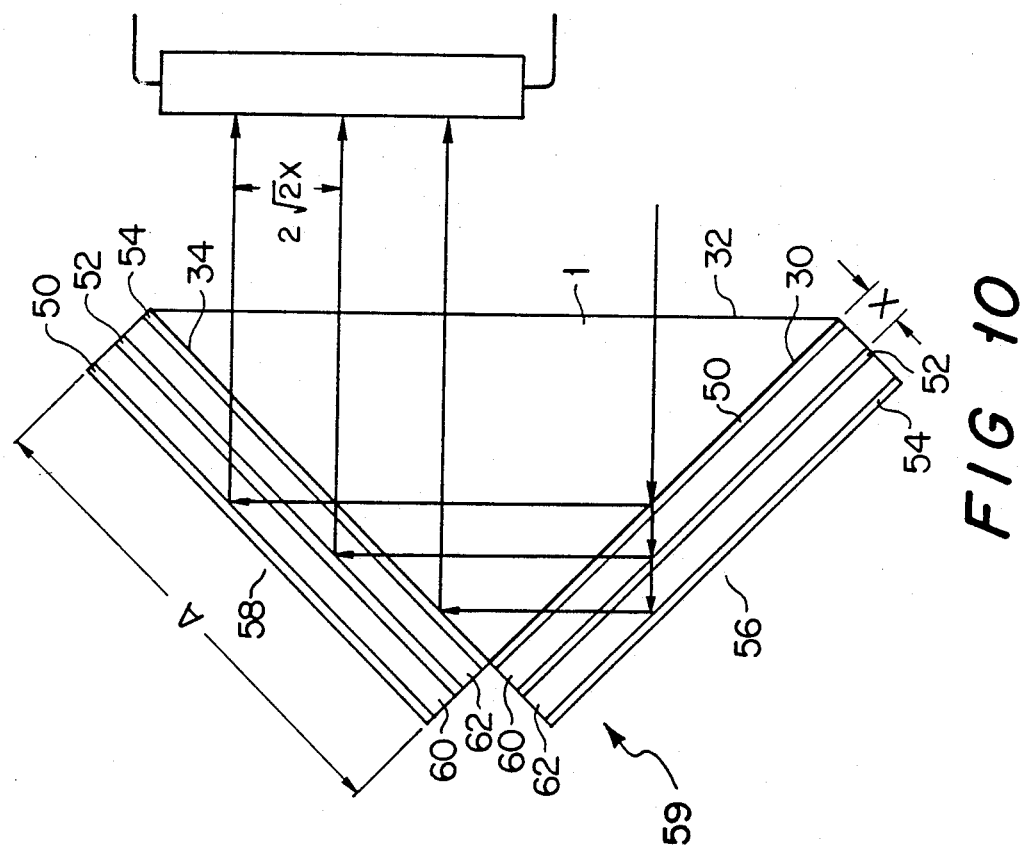
FIG. 10 shows the dual trichromatic beamsplitter with an attached prism.

In order to align photosensor 11 to be perpendicular to the optical axes of the color-separated beams, the dual trichromatic beamsplitter with prism 59 shown in FIG. 10 is adopted. In this embodiment, the pathlengths-through-glass of the color-separated beams are made equal by the reciprocal arrangement of the trichromatic beamsplitters 56 and 58.

As shown in FIG. 10, the incident light beam is aligned to impinge the hypotenuse face 32 of right angle prism 1 at a normal angle and transmit therein to a first base side 30 of the prism 1 which the light beam impinges at 45 degrees. The composite beamsplitter 56 of FIG. 4 is attached thereto. A trichromatic separation of the red, green and blue spectral components of the incident light beam occurs as previously described. The three reflected component beams re-enter the prism 1 and are directed toward the second base side 34 of prism 1, each separated beam impinging the second base side 34 at 45 degrees incidence. A second composite beamsplitter 58 is attached to the second base side 34 of prism 1. The plates 60 and 62 and the dichroic coatings 50, 52, and 54, in beamsplitters 56 and 58 are identical. However, the orientation of the composite beamsplitters 56 and 58, and the multilayer dielectric coatings 50, 52, and 54, on each base side 30 and 34 of the prism 1 are reversed so that the path lengths of each component color beam entering and exiting the trichromatic prism beamsplitter 59 are identical. That is, a component color beam, such as blue, reflects off the dichroic coating 50 on plate 60 located on base side 30. Next, the blue component reflects off the dichroic coating 50 on plate 60 located adjacent to base side 34. In a like manner, a red component color beam goes from middle filter 52 on base side 30 to middle filter 52 on base side 34, and the green component reflects off a backside filter 54 to a front side filter 54 as shown in FIG. 10 Reflected beams from the trichromatic beamsplitter 58 adjacent to base side 34 are directed out of prism 1. The beams are perpendicular to the hypotenuse side 32 and parallel to the incident light beam. The thickness of the beamsplitter glass plates, 60 and 62, and the dichroic coatings 50, 52, and 54, determine the separation of the reflected beams. Thus, the dual trichromatic beamsplitter 59 provides an equal path length through the glass for all color components. Also, the light enters and leaves the prism at a normal angle of incidence.

An alternative embodiment of trichromatic beamsplitter 59 could omit prism 1. Without the prism 1, incident light impinges the beamsplitter 56 and 58 at 45 degrees, creating astigmatic foci at the focal point of photosensor 11. The degree of effect due to the astigmatism is a function of the depth of focus of the projection lens in the accompanying optical system, the spatial separation of the various dichroic coatings composing the trichromatic beamsplitter and the angle of incidence of the beams. The primary advantage of such an alternative embodiment is the removal of glass in the optical path for which a lens must correct.

Figure 12:
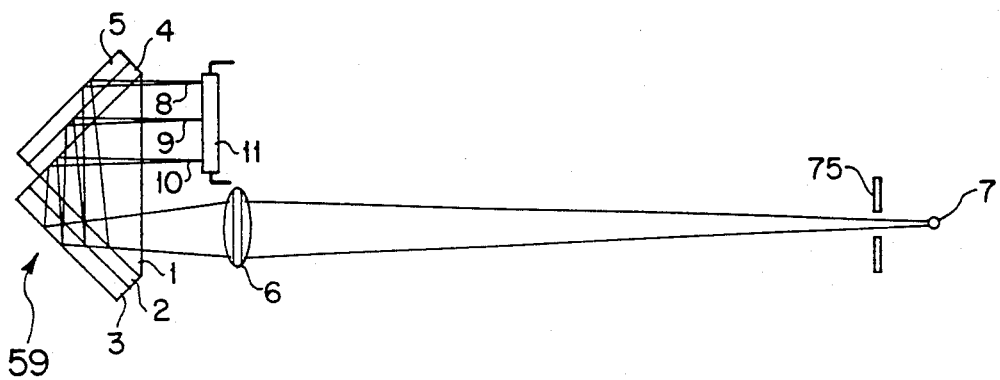
FIG. 12 shows an optical system employing the dual trichromatic beamsplitter with a prism.
Figure 13:
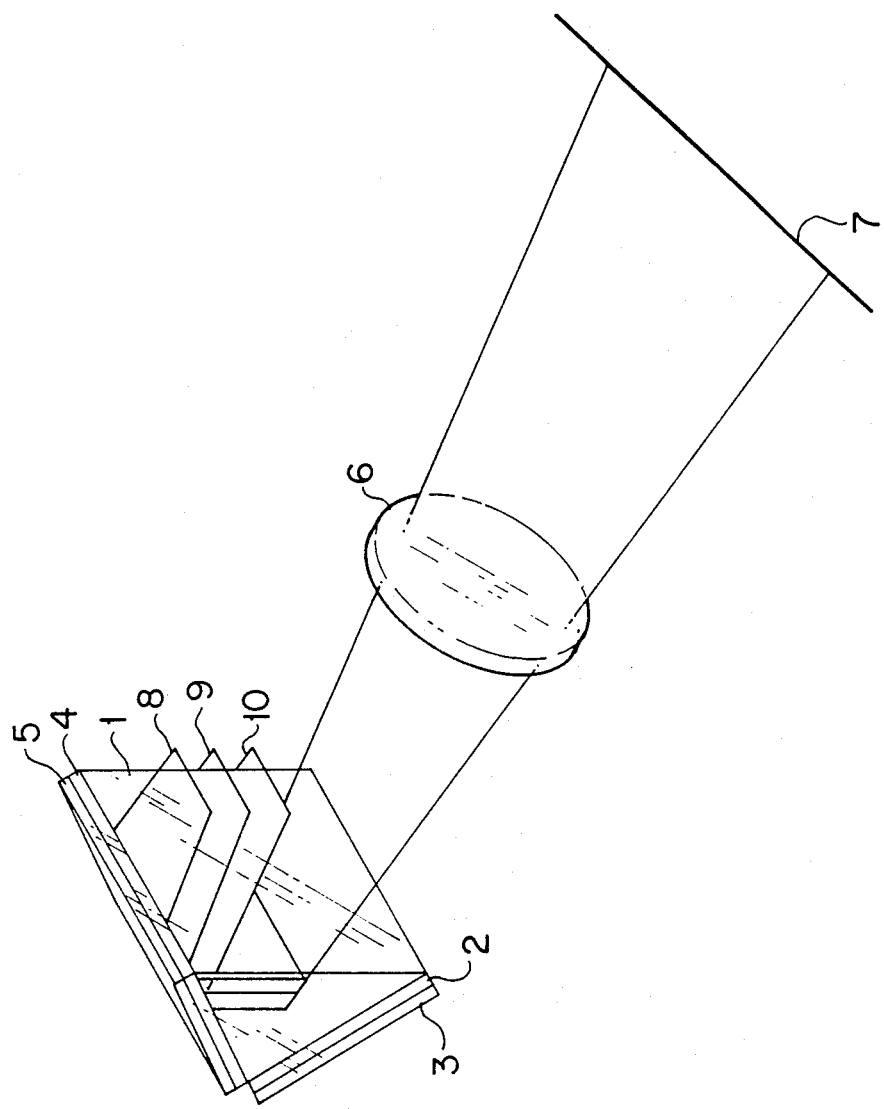
FIG. 13 shows an isometric view of the dual trichromatic beamsplitter with a prism.

By way of example only, an optical system employing the trichromatic beamsplitter 59 of FIG. 10 is shown in FIGS. 12 and 13. A similar optical system can be employed with the beamsplitters 56 and 58, and prismless beamsplitter 59, in FIGS. 7, 9 and 10, respectively, or a beamsplitter that separates an incident light beam into more than three spectral bands through the compositing of multiple beamsplitter plates. A line image 7 of an original object is projected through an aperture 75, as shown in FIG. 12, by a lens 6 through the hypotenuse face of prism 1 such that the optical axis of the incident beam is normal to said face. Aperture 75 is constructed to block images from far away adjacent object lines about the principal object line 7 which would otherwise allow multiple separated images to strike the photosensors. The incident beam is separated into its three color components as previously described. The blue, red and green components emerge from the prism 1 as line images 8, 9 and 10, respectively. Since the individual path lengths of the color component beams through the beamsplitter 58 are identical, the said line images 8, 9 and 10 reside on a single plane which is perpendicular to the hypotenuse face of prism 1. The spatial separation of the three line images 8, 9 and 10, is determined by the glass plate spacing of the six dichroic coatings, 50, 52, and 54, on the beamsplitter plates 60 and 62. By carefully tolerancing the individual thicknesses of beamsplitter plates 60 and 62, the spatial separation of focused line images 8, 9 and 10 can be very accurately determined and maintained. This feature is particularly suited for trichromatic photo detection on said monolithic solid state photosensor 11 shown in FIG. 12 and 5. Each line image, 8, 9 and 10, is electronically detected by one of three parallel spaced photosensors, 12, 13 and 14.

Figure 11:
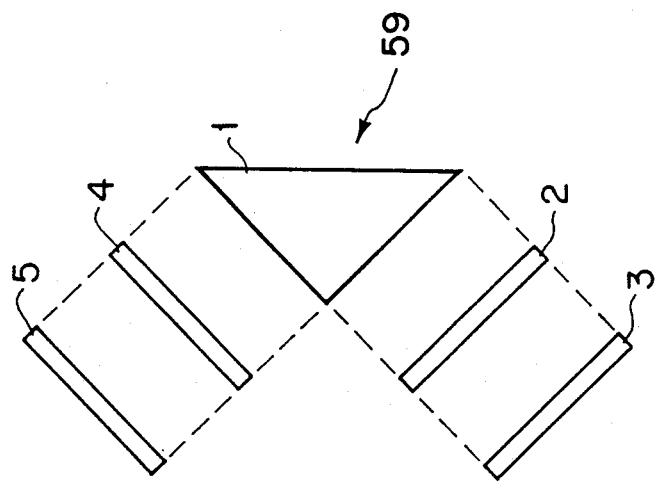
FIG. 11 shows an assembly view of the dual trichromatic beamsplitter with a prism.

An assembly view of the described trichromatic beamsplitter 59 is shown in FIG. 11. The four beamsplitter plates 2, 3, 4, and 5 are oriented about prism 1 as shown and secured together with optical cement according to standard practice. Said optical cement is selected to have matching refractive index with the glass. Typical optical cements are polyester or acrylic bases. In the assembly process it is important to minimize glue line thickness, preferably micron to submicron glue films, to minimize random variation in the spacing of the dichroic coatings on the beamsplitter plates. This is typically accomplished by the application of heat and pressure to the composite structure during the adhesive process.

Referring now to the beamsplitter dimensioning shown in FIG. 10, assuming the dichroic coatings 50, 52, and 54 are separated by a distance X, the incurred separation of the three focus line images 8, 9 and 10, will be (SQRT 2)(2x). The separation of the dielectric optical filters, 50, 52 and 54, is dominated by the glass plate thickness (the filter 50, 52 and 54 thickness is typically 3 micrometer for standard dichroic coatings). Thus, the glass plate thickness principally determines the separation between image lines 8, 9 and 10. Variations in image lines 8, 9 and 10 separation are determined by variations in glass plate separation. For example, to maintain image lines 8, 9 and 10, a spacing tolerance of 7 microns (one-half of standard 13 micron photoelement) a glass plate thickness tolerance of 2.5 microns (0.0001 inch) is required. Such glass thickness accuracy is available using conventional grinding and polishing procedures and equipment.

The color component's path length through the trichromatic beamsplitter 59 is $(2)^{\frac{1}{2}}A + 2(2)^{\frac{1}{2}}X$ where A is the dimension of a base side of prism 1, as shown in FIG. 7A. Reasonable small variations in the base and plate dimension can usually be handled by normal depth of focus characteristics of most lenses.

As previously indicated, the line images 8, 9 and 10 and photosensor arrays 12, 13, and 14 preferably have matched spacing. Thus, the spacing between photosensor arrays 12, 13, and 14 should be (SQRT 2)(2x) when the spacing between the dichroic coatings 50, 52 and 54 is x in beamsplitter 59 as shown in FIG. 10. Thus, an array spacing of 1.0 mm required a beamsplitter plate 60 and 62, thickness of 0.35 mm. for beamsplitter 59. Under normal conditions, dichroic coatings 50, 52, and 54, applied to glass plates of such small thickness will cause a mild bowing of the glass plate. During assembly of beamsplitter 59, however, the bow can be removed by the plate's adherence and conformity to the rigid flat surface of the prism 1. Reasonable minimum array spacings for CCD photodiode arrays are about 0.2 to 0.3. Such minimum spacings dictate beamsplitter plates 60 and 62, on the order of 0.07 to 0.2 mm. thick, depending on the beamsplitter embodiment utilized. To achieve these dimensions in manufacture, the previously described fabrication technique of FIG. 8 is recommended. It is obvious that this technique is applicable to all of the aforementioned trichromatic beamsplitter embodiments.

The profile view of FIG. 12, has the appearance of a "projection" imaging apparatus. That is, a relatively long object line 7 is projected into smaller image lines 8, 9 and 10 via lens 6. In such a system, the photoelements 80 shown in FIG. 6 in the photosensor arrays 12, 13 and 14 must be proportionately smaller than the desired scanning resolution of the original. The advantages of such a "projection" type scanning device is the use of a small photosensor arrays 12, 13 and 14.

The present invention is not limited to "projection" optics and, in fact, is quite extensible into other product and application forms. In particular, the present trichromatic beamsplitter 59 and three linear array photosensor 11 can be packaged with a fiber array lens 15 to produce a "contact" type scan head 57, shown in FIG. 14. "Contact" type scan heads 57 principally use lenses with unity magnification. As such, the lens and sensor can be compacted in close proximity to the original. (The scan head does not actually contact the original as the name would imply.)

Figure 14:
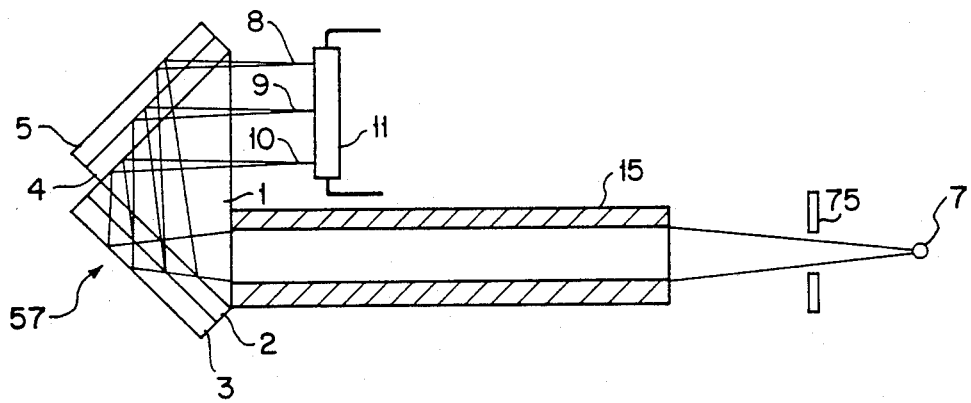
FIG. 14 shows an alternate embodiment of the invention.

Fiber array lenses 15 are well known in the imaging field and are a product of Nippon Sheet Glass (Japan) under the name SelFoc Lens. The fiber array lenses 15 are available in small and long length such as page width. The fiber array lenses 15 are made of glass fibers of given length. Each fiber acts as an individual lens since chemical treatment varies the refractive index as a function of its radius. In this instance, the lens array 15 projects the line image of an original 7 through the trichromatic beamsplitter 59 to three linear array sensor 11. The length of the lens array 15, beamsplitter 59 (or other previously described beamsplitter embodiment) and photosensor 11, as it moves into the page in FIG. 14, is determined by the application: relatively long lengths for page width scanning (e.g., 8.5 inches long) or short lengths for "traversing" type scanning in which the scan head 57 is caused to traverse back and forth over the original object by an external mechanism. For equivalent scanning resolution, the contact (unity magnification) type scan head 57 shown in FIG. 14 requires proportionately less stringent tolerance on beamsplitter plates 2, 3, 4 and 5 thickness in comparison to the projection type scanner shown in FIGS. 12 and 13. On the other hand, for equivalent scan width, the contact scanner 57 must be proportionately longer as measured by the ratio of the lens magnifications, unless the scan head 57 is traversed across the original.

A significant advantage of dichroic coatings 50, 52 and 54 over other filtration techniques is design versatility with respect to bandpass wavelengths and the slope and crossover characteristics of the band pass. Very sharp step function bandpass as well as controlled slope crossover with adjacent color bands is controller by a number of layers, material type, and coating layer thicknesses in a given filter. In the visible spectrum very clean bandpass discrimination can be achieved between red, green and blue or cyan, magenta and yellow. By contrast, conventional organic dye filters, as used in the prior art, are typically not as well-defined and usually have close band or multiple band filtration characteristics which ultimately prevents accurate color separation, usually due to undersaturation of a given detected trichromatic color.

The teachings of the present invention have been principally applied to color document scanning. Scanned document images, in this instance, are displayed on a color monitor. The accuracy of the color separation is judged by the likeness of the displayed image colors to that of the original document. To obtain color fidelity, the color separation must match the spectral characteristics of the individual red, green and blue phosphorus in the monitor display screen. This was successfully achieved by using dichroic beamsplitters 16 and 17 and a phosphor-tailored fluorescent lamp 22 in a test apparatus, depicted in FIG. 15. The test apparatus utilizes three single linear array CCD photosensor 18, 19 and 20 (Toshiba TCD 102C-1) with a 2048 element array.

Figure 15:
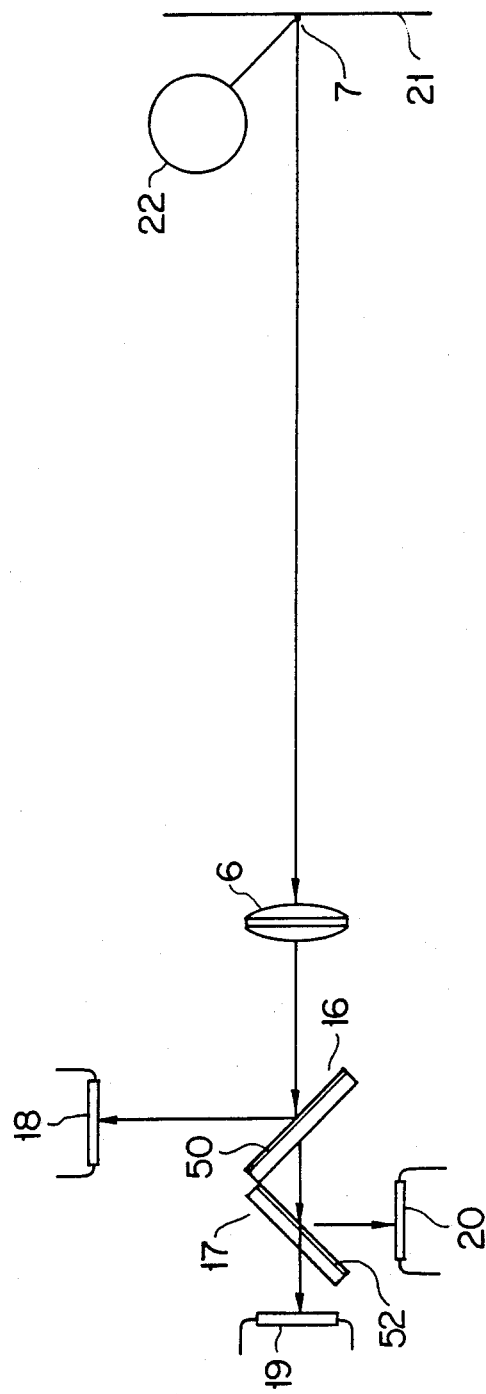
FIG. 15 is a test apparatus for the filters.

Referring to FIG. 15, a fluorescent light source 22 illuminates the surface of an original document 21. A line image of the original seven is projected onto a beamsplitter assembly, consisting of dichroic beamsplitters 16 and 17, by lens 6. Beamsplitters 16 and 17 are flat glass plates coated on one side with dichroic coatings 50 and 52, respectively. Beamsplitter 16 is designed to reflect blue light while transmitting red and green spectral bands. The blue light is reflected to a first CCD linear-array photosensor 18, with beamsplitter 16 tilted at 45 degrees to the incident light beam. Beamsplitter 17 reflects red light to a second CCD photodiode array sensor 20. The beamsplitter plates are Optical Coating Lab commercial blue and red 45 degrees Dichroic Color Separation Filters. The green line image passing through both beamsplitter plates is captured by the third CCD photodiode array sensor 19. Beamsplitter plate 17 is also aligned at 45 degrees, as shown.

Figure 16:
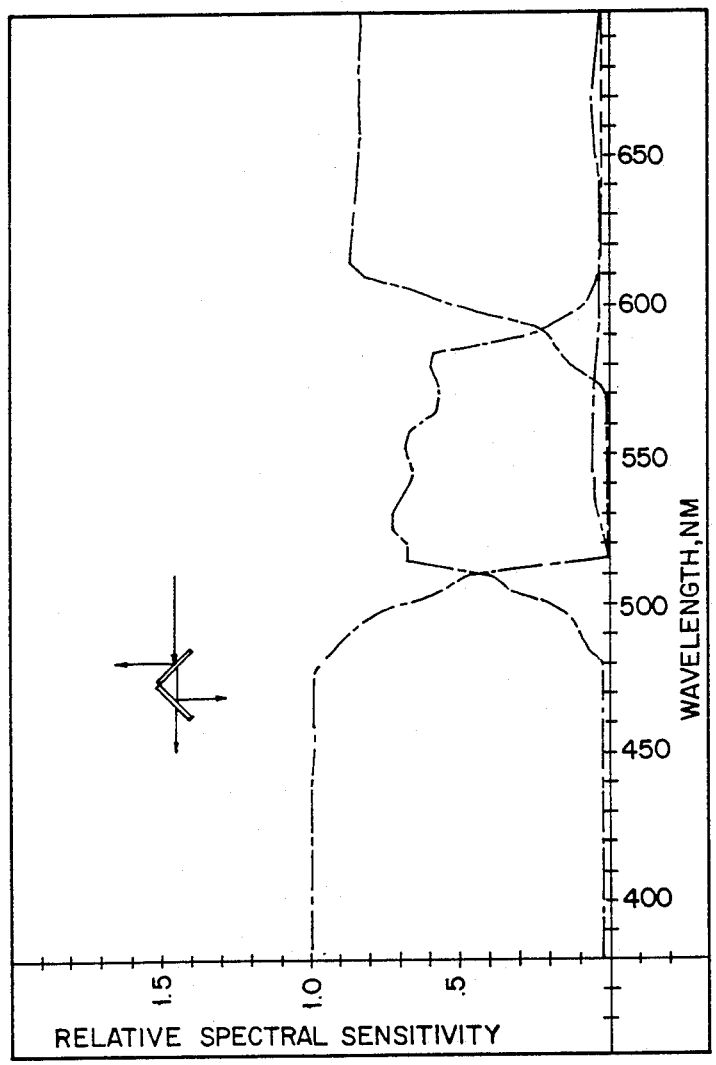
FIG. 16 is the spectral transmission of the filters in FIGS. 2 and 3.
Figure 17:
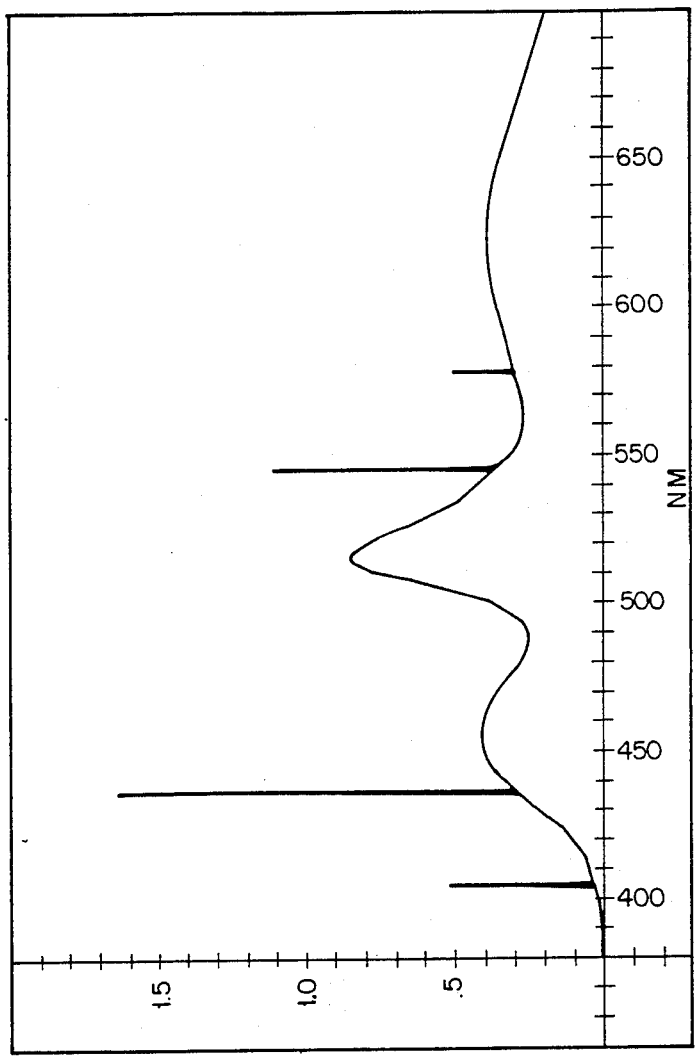
FIG. 17 is the output of the lamp tailored to the spectral transmission shown in FIG. 16.

The band pass characteristics of the collective beamsplitter assembly of FIG. 15 is shown in FIG. 16. Although the crossover wavelengths between color bands is clean and spectrally accurate for separation, the reflected bands do not share the spectral shape and balance of the output device's color palette. Output devices include monitors and hard copy devices. Spectral accuracy, in this case, is most easily provided by spectrally tailoring the light source 22. Fluorescent lamp phosphors can be blended to achieve a wide variety of spectra. The spectral bandpass characteristics of the dichroic coatings 50 and 52, can be used to choose phosphors of the lamp 22 so that the color separation of the coatings 50 and 52, will match the monitor's display phosphors. The result of the HP Color Model study was a lamp specification used by Sylvania Lamp to prototype a scanner lamp source 22. The prescribed phosphor recipe (from Hewlett-Packard Company) and the spectra of the prototype lamp, as made and measured by Sylvania, is shown in FIG. 17.

The spectra of the spectrally-tailored fluorescent lamp as separated by the dichroic beamsplitters 16 and 17 and detected by CCD photodiode arrays 18, 19 and 20, produce a color gamut nearly equivalent t standard monitor phosphor output.

Figure 18:
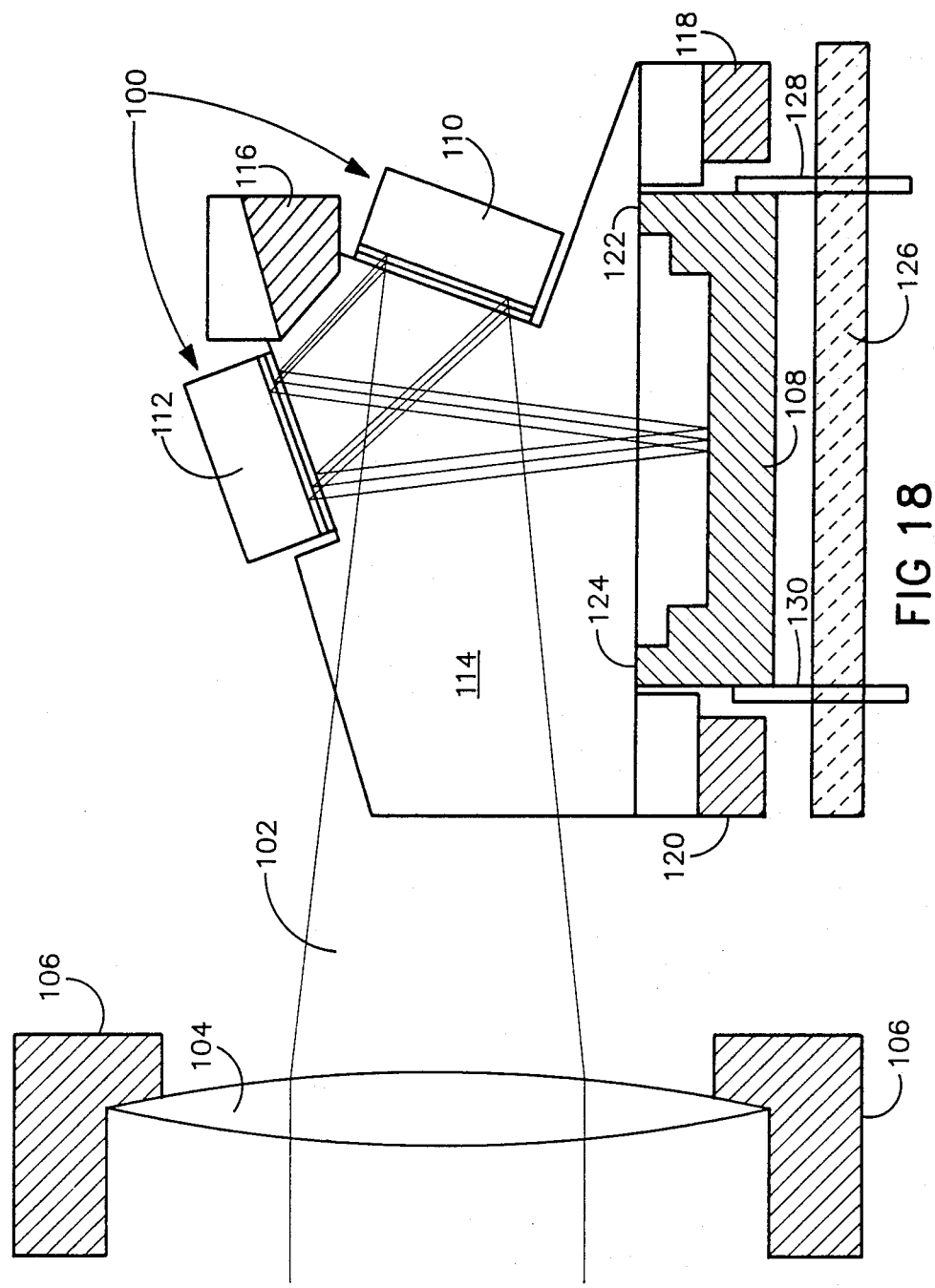
FIG. 18 is a schematic cut-away view of the trichromatic beamsplitter of the present invention mounted with focusing optics and a three line CCD photodiode array.

FIG. 18 is a schematic diagram showing a cut away view of the optical component 100 of the present invention employed as a trichromatic beamsplitter device. As shown in FIG. 18, an input beam 102 is focused by a lens 104 which is held by a lens holder 106 capable of focusing the lens very precisely on the detector surface of the three line CCD array 108. Input beam 102 impinges upon the optical surfaces of the optical separator 100 and is separated into three predetermined colors to form three optical beams having predetermined spectral ranges that are carefully selected by the dichroic layers placed on the optical surfaces of the optical separator 100. As shown on FIG. 18, the first dichroic layer device 110 is disposed such that the angle of incidence of the optical axes of input beam 102 is approximately 22.5 degrees. Input beam 102 is then split into three spatially and spectrally separated beams that are transmitted to a second dichroic layer device 112 which is also disposed at approximately 22.5 degrees to the optical axes of each of the spatially and spectrally separated optical beams. The second dichroic layer device 112 is normally constructed in the same manner as the first dichroic layer device 110 so that the three separate optical beams that are transmitted from the second dichroic layer device have equal optical path lengths to a predetermined image plane. As shown in FIG. 18, the detector device 108 is disposed on the image plane that is substantially normal to the optical axis of input beam 102. Each of the three spatially and spectrally separated optical beams is focused on a separate line detector array on detector 108 so that a line scan of, for example, a document, results in each of the colors from the line scan being detected simultaneously on the detector surface of detector 108 as a result of the equal optical path lengths of each of the individual spectrally separated beams. The dichroic layer devices 110 and 112 are precisely held in the positions illustrated by a mounting device 114 that includes arm support structures 116, 118 and 120 that extend between two side portions. The support structure 114 is open in the central portions to allow light to be transmitted to the optical component 100 and subsequently to detector 108. Detector 108 is also precisely located in the mounting device 114 by way of interface surfaces 122 and 124. Signals derived from detector 108 are fed directly to circuit board 126 via connectors 128 and 130 that comprise a plurality of connectors.

Figure 19:
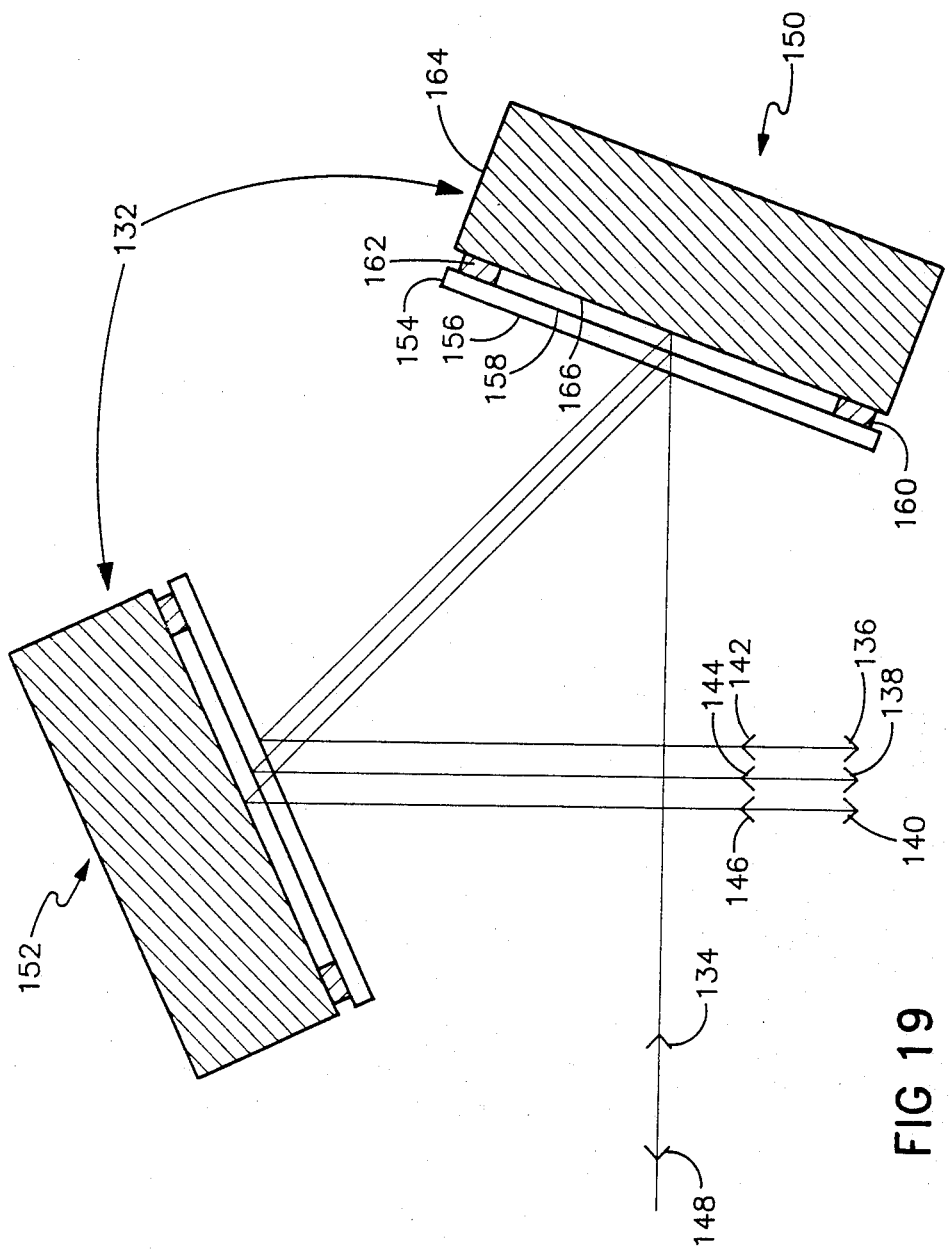
FIG. 19 is a schematic diagram illustrating one embodiment of the optical component of the present invention that can function either as a color separator or a color combiner.

FIG. 19 illustrates an alternative manner in which the optical component of the present invention can be constructed and utilized. As shown in FIG. 19, the optical component 132 can be used to separate an input beam 134 into three separate spatially and spectrally separated beams 136, 138 and 140. Alternatively, the optical component 132 can be used to combine three spatially and spectrally separated input beams 142, 144, and 146, into a single combined output beam 148 that spectrally and spatially combines each of the input beams such that each optical axes of the input beams 142, 144 and 146, are coincident as shown by output beam 148. Of course, all of the optical devices illustrated and described herein can be used in this manner as an optical combiner as long as the optical axes of each of the spatially and spectrally beams is aligned properly with the optical component, such as optical component 132.

FIG. 19 also illustrates the manner in which each of the dichroic layer devices 150 and 152 can be constructed. As illustrated in FIG. 19, dichroic layer devices 150 comprises a substantially transparent optical support medium 154 that is coated on both sides with dichroic layers 156 and 158. The substantially transparent optical support medium 154 is supported by spacers 160 and 162, that are attached to a substrate device 164 having either a totally reflective surface 166, or a surface coated with another dichroic layer to provide a specified spectral range to be reflected from surface 166. The space between the surface 166 and the dichroic layer 158 can comprise an air gap or can be filled with an optically transparent medium or can be evacuated, depending upon the application of the optical component 132. As shown in FIG. 19, the optically transparent support medium 154 can comprise a glass plate that has a higher refractive index in the surrounding air, causing the individual optical beams to be refracted at different angles. Since the optical surfaces are reversed in dichroic layer device 152, the optical path lengths are adjusted so that they are equal in length to a plane that is substantially normal to the optical axes of each of the individual beams. Of course, the same is true whether the optical component 132 is being used as a color separator or color combiner. The difference in the refractive index of the glass plate versus the air gap does not cause a change in optical path lengths due to the fact that the surfaces from which the beams are reflected is reversed on the subsequent dichroic layer device as long as the glass plate has an air equivalent path length of the air gap. More specifically, a first and second dichroic plane may be separated by a distance $X_1$ by material having an index of refraction of $N_1$, and the second and a third dichroic layer are separated by a distance $X_2$, by material having an index of refraction of $N_2$. To have equal optical path lengths through the dichroic layers, the following must be true:

$$X_1/X_2 = N_1/N_2$$

Hence, to maintain an air equivalent path length that is the same through each medium, the spacing between any two planes is directly proportional to the spacing between the other planes times the index of refraction of the material between the other two planes, and inversely proportional to the index of refraction of the material occupying the space between the other two planes. This is easily discernable when considering an air gap spacing since air has an index of refraction equal to 1.

As illustrated in both FIGS. 18 and 19, the angle of incidence is approximately 22.5 degrees for each of the dichroic layer devices. The low angle of incidence and the very small plate size that is used in many applications results in minimal astigmatism so that more expensive optical prisms can be eliminated without noticeable degradation of optical quality.

Figure 20:
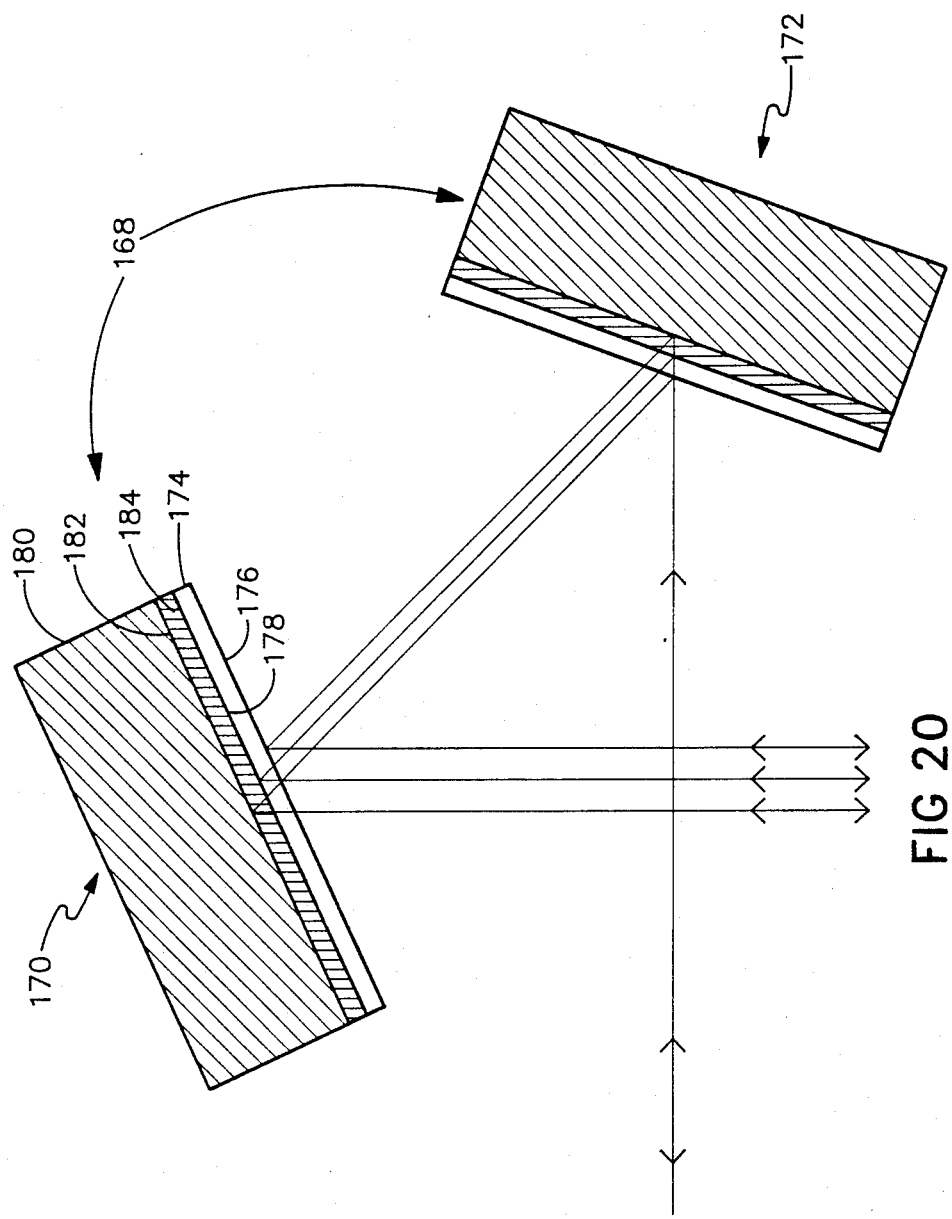
FIG. 20 illustrates another embodiment of the optical component of the present invention that can comprise either an optical separator or an optical combiner.

FIG. 20 illustrates an optical component 168 that can be constructed in an alternative manner. Optical component 168 can comprise first and second dichroic layer devices 170 and 172, that can be used for either spectrally and spatially combining or separating optical beams. As shown, dichroic layer device 170 has a substantially transparent optical support medium 174 that has dichroic layers 176 and 178 disposed on two substantially flat sides. The substantially optically transparent support medium 174 is attached to a substrate 180 having either a totally reflective surface 182, or a surface coated with another dichroic layer to provide a specified spectral range to be reflected from surface 166 by way of an optical glue 184 that is capable of transmitting substantially all optical radiation. The optical glue, such as previously disclosed above, can have an index of refraction that closely matches the optically transparent support medium 174 to prevent a change in the angle of refraction within the dichroic layer device 170. As mentioned previously, the optical transparent support medium 174, for many applications, must be very thin to produce the desired spacing between the beams. Coating of the dichroic layers 176 and 178 on the glass plates 174 may result in a bending or warpage of the optical transparent support medium 174. However, substrate 180 has sufficient thickness to prevent warpage and has a substantially flat reflective surface 182 to which the optical transparent support medium 174 can be attached by way of the optically transparent glue 184. Proper attachment of the optical transparent support medium 174 to the substantially flat reflective surface 182 can provide sufficient support to maintain a substantially flat surface on optical transparent support medium 174. Of course, the thinner the glue layer is between optical transparent support medium 174 and the substantially flat reflective surface 182, the stiffer the glue line becomes which, in turn, further restricts relative movement. To provide even additional support, a glass plate with a thin layer of adhesive on both sides can be used in place of the optical glue 184. Again, dichroic layer device 172 would typically be constructed in the same manner as dichroic layer device 170 to simplify the overall optical component 168.

Figure 21:
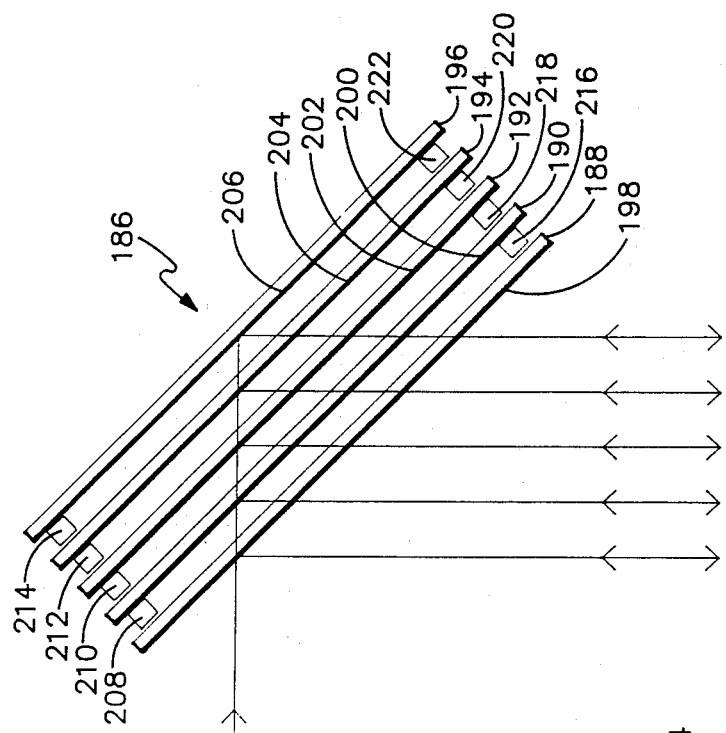
FIG. 21 shows another embodiment of the optical component of the present invention that can comprise either an optical separator or optical combiner.

FIG. 21 illustrates an alternative manner of constructing a dichroic layer device 186. Again, FIG. 21 illustrates that the dichroic layer device 186 can be used either as a beam splitter or a beam combiner. Additionally, only one composite dichroic component 186 is illustrated, although additional composite dichroic component devices can certainly be utilized to equalize optical path lengths and direct the optical beams to different locations.

FIG. 21 also illustrates that a plurality of optical transparent support media 188, 190, 192, 194, and 196, can be used to either separate or combine a plurality of beams. Of course, any number of beams can be combined or separated using the techniques of the present invention. As shown in FIG. 21, each of the optically transparent support medium 188, 190, 192, 194, and 196, have dichroic layers 198, 200, 202, 204, and 206, disposed on its front layer. Spacers 208, 210, 212, 214, 216, 218, 220 and 222, support and separate each of the optically transparent support media 188, 190, 192, 194, and 196. Where large separation of the individual spectral beams occurs or is desired, the dichroic layer device 186 illustrated in FIG. 21 is ideally suited. The spacing provided by spacers 208, 210, 212, 214, 216, 218, 220 and 222, can be varied to account for the increased thickness such as the increased glass thickness of each of the optical transparent support media 188, 190, 192, 194, and 196, as the beam is transmitted through the dichroic layer device 186 to insure proper alignment of each of the individual spectral beams. Of course, optical glues, angles of incidence, plate thicknesses, use of prisms and other techniques, such as described herein, can be used in any of the devices shown, to reduce the effects of astigmatism and prevent other possible problems. Of course, it should be understood that any manner of supporting and separating substantially parallel dichroic planes can be used in addition to the glass plates, glue layers, spacers, etc., disclosed herein. The method of support and separation of a plurality of dichroic planes is secondary to the primary invention disclosed herein which comprises the use of a plurality of dichroic planes disposed at an angle to the optical beams for either spatially and spectrally combining or separating the beams. Additionally, the last optical transparent support medium 196 can be replaced with a totally reflective surface as described above.

Figure 22:
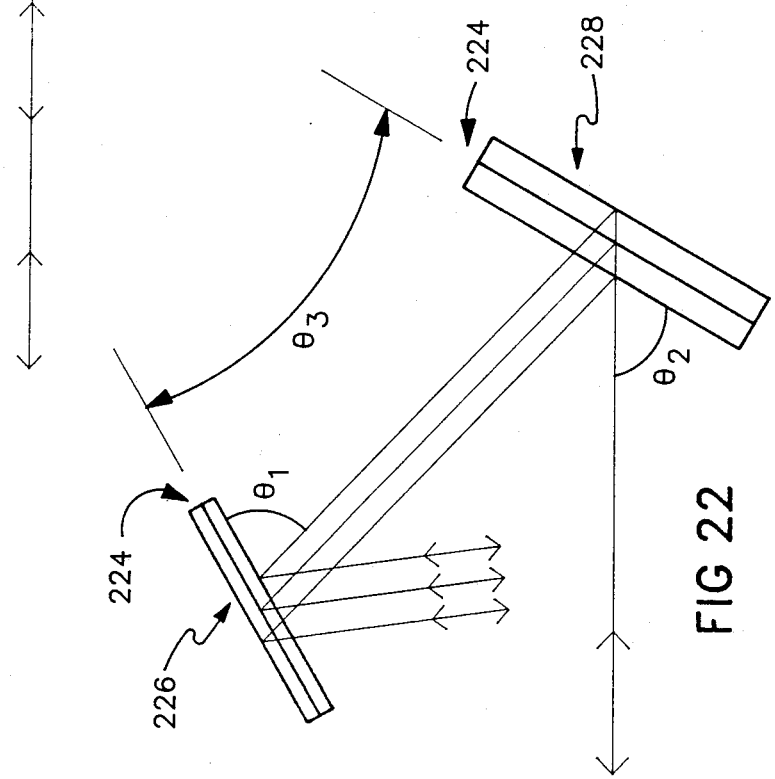
FIG. 22 illustrates the manner in which the plate separation and angle of incidence can be varied in the optical component that can comprise either the color separator or color combiner.

FIG. 22 illustrates other implementations of the optical component 224 of the present invention. As illustrated in FIG. 22, the spacing of the dichroic layer devices 226 and 228 can be changed as well as the angles of impingement, Theta One and Theta Two of the optical beams with the dichroic layers devices 226 and 228, respectively. Additionally, the total included angle theta three can also be varied to direct the optical beams to a predetermined plane. It is possible to maintain equal optical path lengths as well as vary the spacing between the optical axes of each of the individual spectral beams by varying both the angle of impingement and the plate thicknesses. As mentioned previously, the materials utilized in the dichroic layers devices 226, 228 can also be different to change the index of refraction as well as the path length of the optical beams within the dichroic layer devices to provide an additional manner of adjusting the optical component 224 of the present invention. For the purposes of simplicity, FIG. 22, as well as other drawings disclosed herein, have been drawn without the angles of refraction illustrated.

Figure 23:
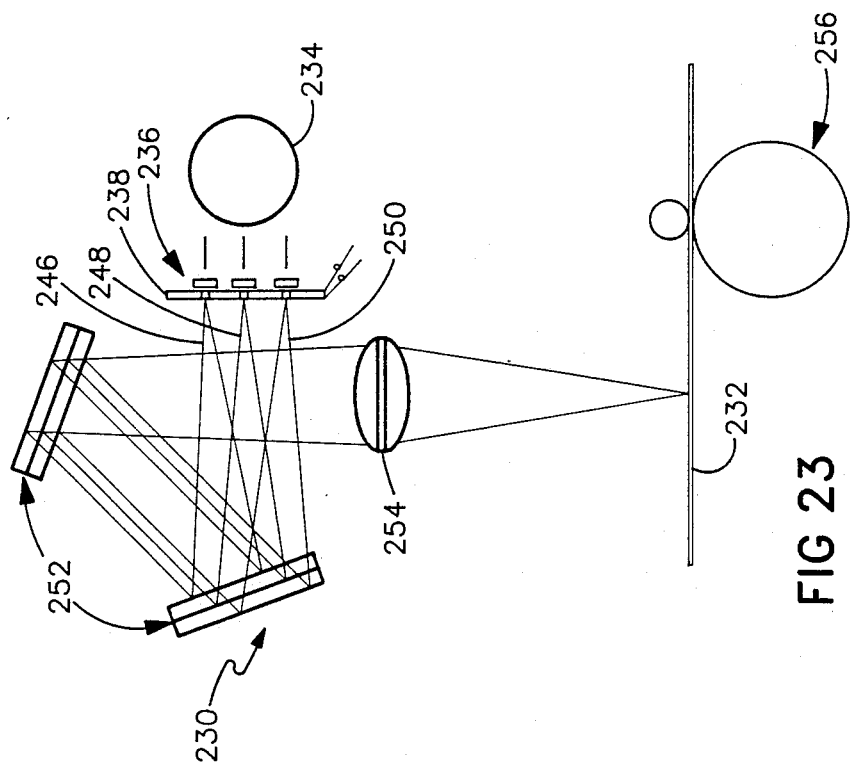
FIG. 23 is a schematic side view of a color printer embodiment of the present invention.

FIG. 23 is a schematic side view of a color imaging device 230 that generates a color image on a recording medium 232 located on an image plane. As illustrated in FIG. 23, an illumination source 234 provides a source of white light which is filtered by filters 236 to provide three separate color beams that have predetermined spectral ranges and function as three separate sources of illumination. The color filters 236 are located adjacent to a liquid crystal display (LCD) device 238 that is further illustrated in FIG. 24.

Figure 24:
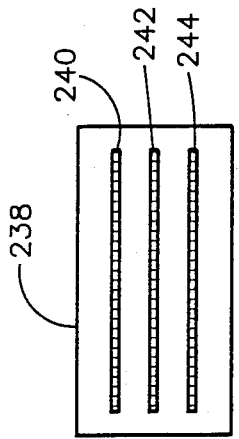
FIG. 24 is a schematic plan view of a three line liquid crystal display (LCD) shutter device.

Referring to FIG. 24, the liquid crystal display device 238 has three linear arrays 240, 242, 244 of liquid crystal display shutters that are capable of transmitting light on a continuously variable gray scale from essentially a total throughput level to approximately opaque in response to an electrical control signal. A resolution of approximately 1000 elements per inch can be obtained in LCD arrays, such as illustrated in FIG. 24. As a means of comparison, fine grain film may typically have a range of resolution of 600 to 800 line pairs per inch. Hence, a very high resolution can be obtained using LCD shutters. LCD shutters are available through several manufacturers including Epson Corporation and Sharp Corporation in Japan.

Referring again to FIG. 23, the three optical beams 246, 248, and 250, that are transmitted from LCD shutter 238 have been adjusted in intensity to represent the color intensity of a single line of information to be recorded on recording medium 232 in accordance with the image information provided by the control signal. Optical beams 246, 248, and 250, are directed through optical component 252, which can comprise any of the optical components disclosed herein, and are focused by lens 254 onto the recording media 232. As illustrated, the three separate lines of information provided by each of the line matrices 240, 242 and 244 (FIG. 24), is combined into a single beam having coincident optical axes such that each pixel element comprises a combination of the three primary colors from each of the optical beams 246, 248 and 250. This results in very high convergence and line acuity that is not possible using other techniques. For example, one method that has been contemplated for recording documents in this manner utilizes a CRT color monitor that is focused on a recording document with each of the colors sequentially exposed on the recording media. Not only does this technique require three separate exposures of the recording media, which is expensive and time consuming, line acuity and convergence are extremely low because of the triad of colors that are required in CRT color monitors.

The recording media 232 of FIG. 23 can comprise a wide range of recording media. For example, the present invention could be used for presentation graphics by using a special color exposure paper available from Mead Company. The Mead paper is coated such that, when it is exposed to light, it changes chemically. The paper is then run through a roller which crushes the chemically altered coating to produce a color print. Additionally, recording medium 232 can comprise photographic film or any other recording medium capable of recording optical radiation, including non-visible radiation. Rollers 256 function to advance the recording medium 232 and can be driven continuously or in a step fashion using a stepping motor to correspond to the manner in which the control signal is applied to LCD shutter device 238. Alternatively, LCD shutter device 238 can comprise three arrays of light emitting diodes (LEDs) that produce three different spectra of light in response to a control signal. In that case, the illumination source 234 and filters 236 can be eliminated.

Figure 1:
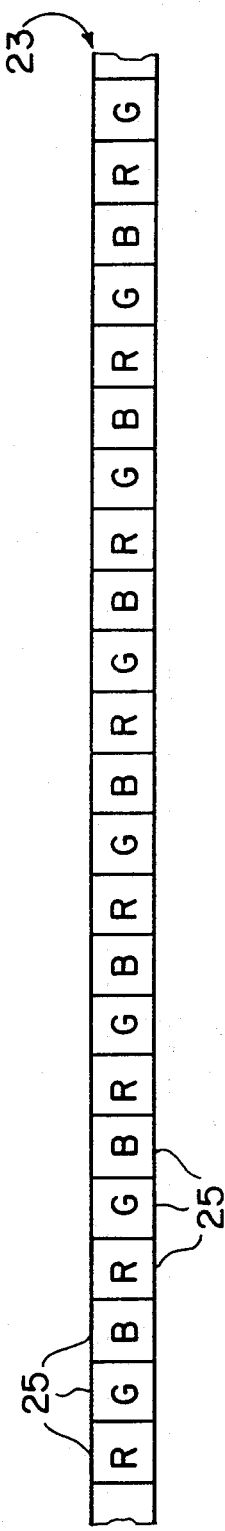
FIG. 1 is a prior art color sensor.
Figure 25:
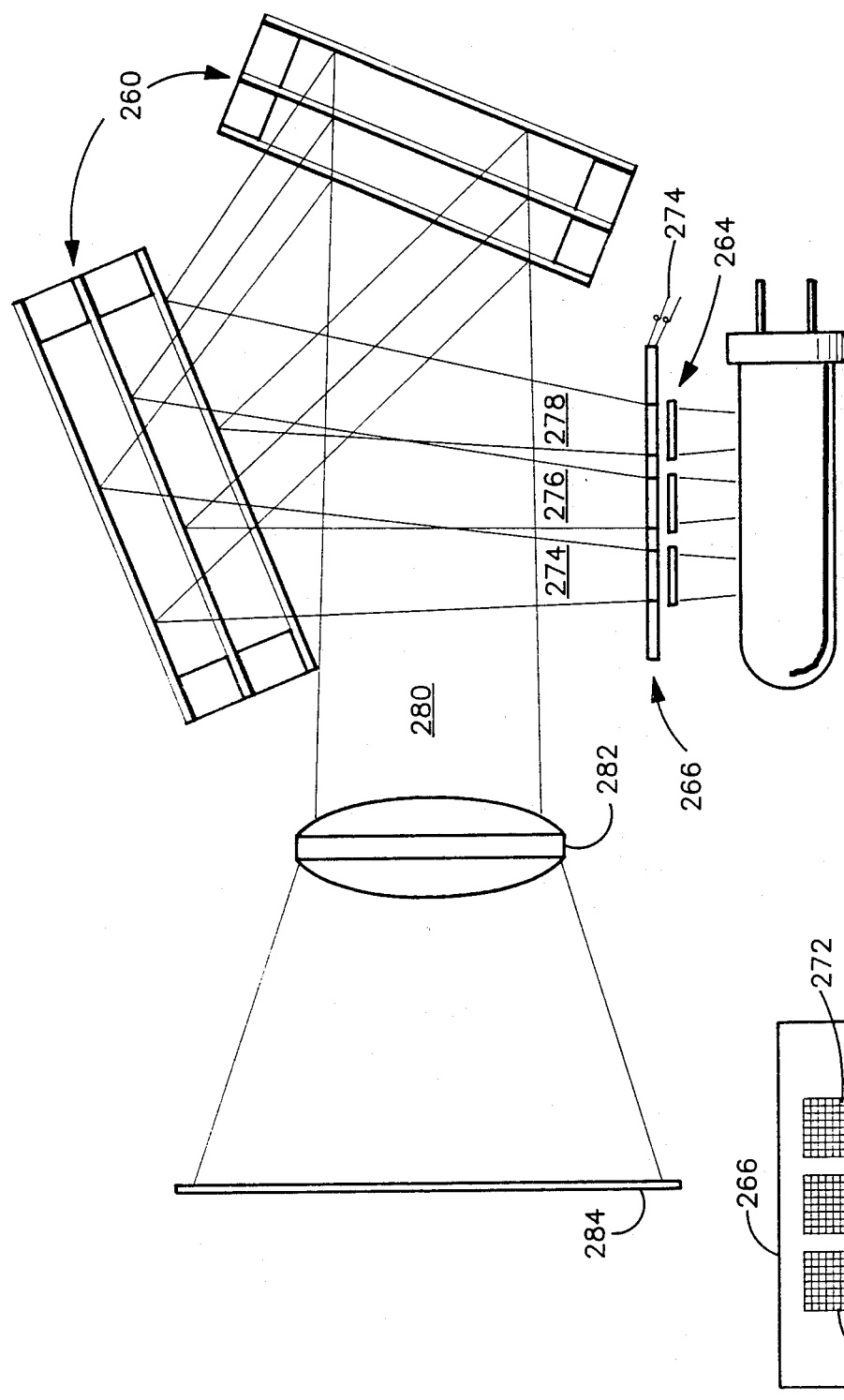
FIG. 25 is a schematic side view of a color projection device.

FIG. 25 is a schematic side view of a projection device using the optical component 260 of the present invention. As illustrated in FIG. 25, the optical component 260 is constructed in a manner similar to optical component 186 illustrated in FIG. 21 but can comprise any of the implementations of the optical component of the present invention. As mentioned previously, the spacing between the glass plates can be adjusted for the refraction produced in the glass plates. For example, if the angle of incidence is 22.5 degrees, as schematically illustrated in FIG. 25, the angle of the beam within the glass plate changes to approximately 14.61 degrees for glass. To account for added glass thickness, each of the spacers must provide additional space for subsequently deeper layers in the optical component 260. Of course, the advantage of the spaced plate optical component 260, illustrated in FIG. 25, and optical component 186, illustrated in FIG. 1, is that as long as the glass plates are thick enough to provide an optically flat surface without warpage, the spacers provide automatic alignment of the glass plates to an accuracy of approximately two microns.

Figure 26:
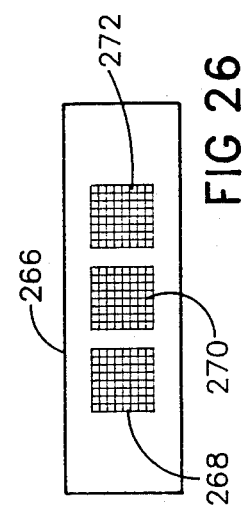
FIG. 26 is a schematic plan view illustrating three matrices of a liquid crystal display (LCD) shutter. Alternatively, FIG. 26 can schematically represent three matrices of light emitting diodes.

FIG. 25 illustrates a two-dimensional projection device in which an optical source 262 produces white light that is filtered by color filters 264 which each project a different spectral range of frequencies. Each of these filters 264 has a two dimensional surface that overlays the LCD matrixes 266. LCD matrixes 266 are also illustrated in FIG. 26. LCD matrixes 266 comprise three individual matrix arrays 268, 270 and 272, which are individually controlled by a control signal schematically illustrated by contacts 274, to provide an image for each separate color of the three primary colors. Of course, any number of matrixes can be used to provide any number of colors desired, although, only the three primary colors are necessary to provide a full color display. Each LCD matrix display is capable of transmitting a pre-determined amount of radiation of each spectral band at each spatial location of each individual matrix element in a continuously variable fashion that is controlled by the image control signal 274. The LCD matrices act as light shutters and are deposited using photolithography deposition precision that allows for very high resolution images. Additionally, they can be deposited on a monolithic substrate which allows the matrices to be aligned with the optical beams very easily, provides a very uniform electrical responsivity across each matrix, as well as between different colors (different matrices), and is easy and inexpensive to manufacture. The three two-dimensional beams are precisely combined in the optical component 260 so that each of the optical beams 274, 276 and 278, has an equal optical path length. The single spectrally and spatially combined beam 280 is then focused by lens 282 on a projection screen 284 which can be designed for viewing either from the front or back sides. Lens 282 is schematic in nature and most likely will comprise at least a two element lens for projection onto screen 284.

An advantage of the projection device illustrated in FIG. 25 is that each pixel element is a superimposition of each of the three colors. In other words, each pixel is a color composite of all three colors. This differs significantly from typical color CRT screens wherein each pixel is a separate color that the eye optically integrates into a single combined color pixel. In accordance with the present invention, a much sharper image is produced since there is a convergence of all three colors in each pixel element. Furthermore, typical color CRT screens require a shadow mask to separate each individual color pixel. Since the present invention has complete color convergence of each pixel, shadow masks are not necessary and much greater picture clarity can be obtained. Most importantly, the projection device of the present invention does not produce the harmful X-rays that are produced by CRTs.

Alternatively, the device of FIG. 25 can be used as a projection device for projecting an image on a recording medium. In other words, projection screen 284 can comprise a recording medium rather than a projection screen so that images can be recorded in both dimensions simultaneously rather than in a single dimension in a serial fashion such as is illustrated in FIG. 23. Moreover, the LCD matrix 266 can be replaced by a series of light emitting diode matrixes such that the filters 264 and illumination source 262 can be eliminated. In this case, each LED matrix 268, 270 and 272, would produce a different spectral range of frequencies.

FIG. 27 is a schematic isometric view of an implementation of the optical component 286 of the present invention employed as a two dimensional color optical component system that could be employed, for example, in a color camera. As illustrated in FIG. 27, lens 288 focuses an image from an object plane 290 through an aperture device 292 that determines the field of view of the color camera device illustrated in FIG. 27. The image from the object plane 290 is focused onto an image plane on which three matrixes of detectors 294, 296, and 298, are disposed to detect the individual color beams that are separated by optical component 286. Optical component 286 is shown constructed as a prism 310 having optical spacer plates 300, 302, 304, and 306 attached thereto. Of course, any of the optical component devices disclosed herein can be used in place of optical component 286, illustrated in FIG. 27, depending upon the precision and expense desired. A clear advantage of the implementation of the present invention illustrated in FIG. 27 is that each of the detector matrixes 294, 296, and 298, can be located in the same plane and adjacent to each other so that they can be constructed on a monolithic substrate. This eliminates many alignment problems that are associated with standard prior art dichroic prism devices and provides a uniform output so that each color intensity need not be individually adjusted for each use or during the course of use of the camera. Because each of the matrixes of detectors 294, 296, and 298, are located on the same substrate, nearly uniform temperature gradient provides for nearly identical variations in output intensity of the signals from the detectors.

FIG. 28 comprises a schematic side view of a color camera device, such as illustrated in FIG. 27, that uses the spaced plate implementation, such as illustrated in FIG. 21 and FIG. 25, for the optical component 312. As illustrated in FIG. 28, an aperture device 314 restricts the field of view of an image that is focused by lens 316 onto the three matrix detector 318, 320, and 322. Optical components 312 split the single optical beam 324 into three separate color beams 326, 328, and 330, having equal optical path lengths, in the manner described previously.

FIG. 29 illustrates the three matrix detector 318, 320, and 322 that are mounted on a monolithic substrate 332 to provide a uniform color output signal.

Figure 30:
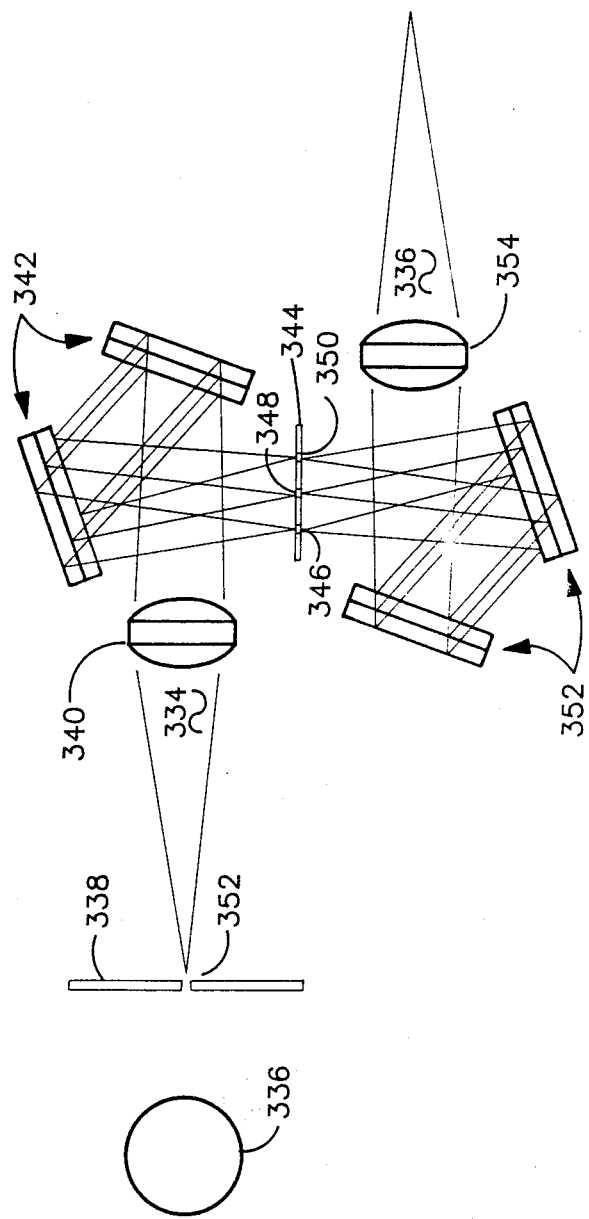
FIG. 30 is a schematic side view of an electronic color filter device.

FIG. 30 illustrates an electronic colored filter device for filtering an input optical beam 334 produced by an illumination source 336 that is imaged through a pinhole or line aperture 351 in an aperture plate 338 to form a filtered output optical beam 336. Input optical beam 334 is focused by lens 340 through the spectral beam splitter 342 onto an aperture plane 344 on which a number of aperture devices, such as LCD shutters 346, 348, and 350, are disposed to vary the throughput of light in response to an electrical control signal. LCD shutters 346, 348, and 350, can comprise either single pinhole apertures or can comprise a linear array depending upon whether aperture 351 comprises a pinhole aperture or a line aperture. The resultant beams that are projected through the LCD shutters 346, 348, and 350, have an intensity that is adjusted by the electrical control signal that controls the opacity of the LCD shutter devices. These beams are then precisely combined by spectral combiner 352 and focused by lens 354 to produce the single combined output beam 336 that is both spatially and spectrally combined and adjusted in spectral content in accordance with the electronic control signal. Again, any number of color beams can be produced in the device illustrated in FIG. 30 together with a corresponding number of shutter devices to provide additional control of the spectral content of output beam 336. Also, any type of shutter device can be used in place of the LCD shutters 346, 348, and 350. Additionally, the individual spectral beams can be produced in any desired manner and it is not necessary that the beamsplitter 342 be employed.

Figure 31:
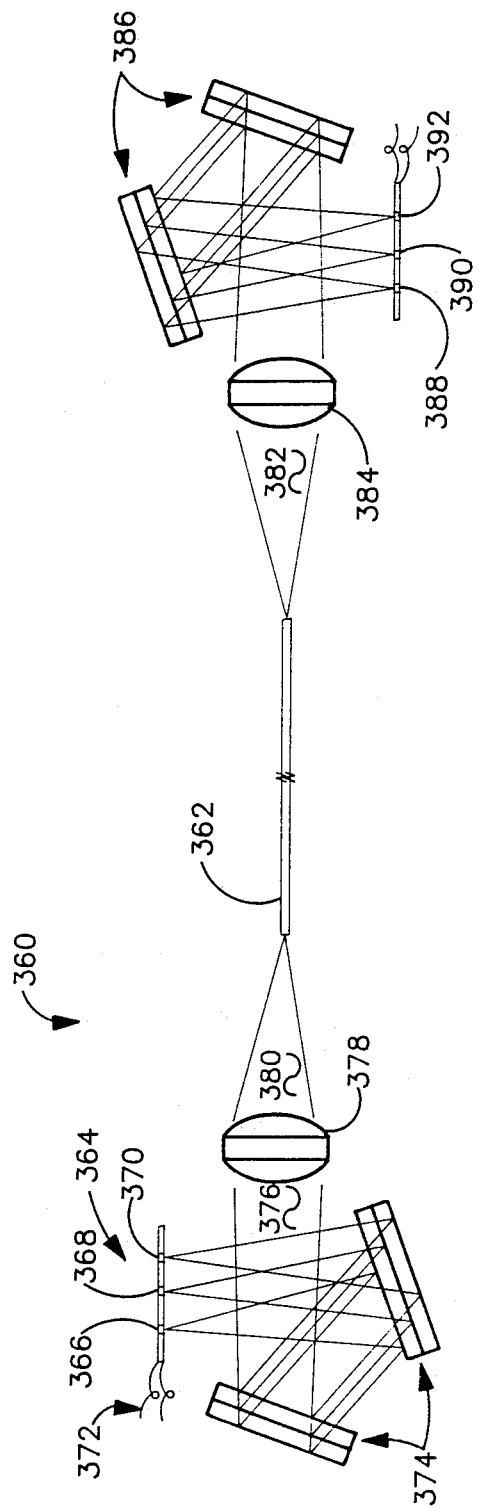
FIG. 31 is a schematic side view of a multiple channel fiber optic communication device.

FIG. 31 comprises a schematic side view of a multiple channel fiber optic communication device 360. Fiber optic communication devices allow transmission of high bandwidth information across a fiber optic such as fiber optic 362. This allows for high frequency modulation of an optical source such as laser diode. Laser diodes can be switched in the megahertz frequency range. However, the demodulated signal at the receiving end constitutes a single station signal since only one carrier frequency is transmitted through the fiber optic.

The present invention, as disclosed in FIG. 31, overcomes these disadvantages and limitations by providing multiple carrier signals in the form of plurality of spatially and spectrally separated beams that have been combined into a single combined beam. As illustrated in FIG. 31, an optical generator 364 contains a plurality of individual and spatially separated optical generators 366, 368, and 370, each having a different spectral range. Each of the individual optical generators 366, 368, and 370, is modulated separately by a separate communication signal via electrical connectors schematically illustrated as connectors 372. The optical component 374 of the present invention is aligned to combine the individual beams produced by optical generators 366, 368, and 370, into a single combined beam 376. The single combined beam is then focused by way of lens 378 into a beam 380 onto the end of a fiber optic 362 for transmission to a remote location.

At the remote location, as illustrated in FIG. 31, the combined spectral beam is transmitted as shown at 382 from fiber optic 362 and focused by lens 384 through the optical component 386 of the present invention onto a plurality of photo detectors 388, 390, and 392. The optical component 386 spatially and spectrally separates the combined beam 382 into its spectral components that are individually focused on photo detectors 388, 390, and 392. Alignment of the optical component 386 and selection of the dichroic filter layers allows for accurate separation of each of these spectral bands that is produced by optical generators 366, 368, and 370, onto photo detectors 388, 390, 392.

The device of FIG. 31 allows for transmission of multiple channels on a single fiber optic 362 by virtue of the ability to spatially combine a plurality of individual beams having different spectral ranges for transmission across fiber optic 362 and subsequently separate the optical beam into its spectral components at the receiving end. In this manner, the present invention provides the ability to transmit multiple carrier bands on a single fiber optic. Of course, as many spectral bands as desired can be transmitted and the present invention is ideally suited for transmitting multiple spectral bands since the dichroic layers can be designed as notch filters to reflect and transmit very narrow spectral bands. Additionally, the optical signal can be generated by any desired optical source including the aperture device 344 illustrated in the electronic filter disclosed in FIG. 30. Also, the optical source 364 can comprise a series of line generators or a matrix of generators that can be focused by lens 378 onto an array of fiber optic cables to facilitate transmission over multiple fiber optic cables in a simple and easy manner.

FIG. 32 schematically illustrates the use of multiple laser sources 394, 396 and 398, which can comprise solid state lasers or gaseous lasers depending upon the application of the optical source. As illustrated in FIG. 32, laser 394 is capable of generating a red beam 400 while laser 396 generates a blue beam 402 and laser 398 generates a green beam 404. Again, as many different optical sources can be used as desired to produce as many beams as required. Laser sources can be used in any of the applications of the present invention illustrated herein. For example, gaseous lasers may be required to produce sufficient power for transmission over extended distances over a fiber optic 362, as illustrated in FIG. 31. Additionally, it may be advantageous to use gaseous lasers in the various projection systems, such as the projection system illustrated in FIG. 25, to produce sufficient illumination of the projection source. Also, color holographic projection or recording may be implemented using lasers.

FIG. 33 shows an alternative implementation of the device illustrated in FIG. 31. As illustrated in FIG. 33, an optical generator 406 capable of generating a plurality of spectral beams is combined into a single beam 408 by lens 410. Lens 410 combines the individual spectral beams into the single combined beam 408 and focuses the single combined beam 408 on the end of fiber optic 412. The invention is then implemented in substantially the same manner as described in FIG. 31 at the receiving end to spatially separate the combined beam 414 by way of optical component 416. Each of the individual spectral beams is focused onto a photo detector 418 by way of lens 420. Because the optical path lengths of each of the individual beams is not critical, due to the fact that each spectral beam comprises an individual carrier band, it is not essential that both composite dichroic devices 422 and 424 be employed to separate the combined beam 414. Hence, only a single composite dichroic device, such as dichroic device 424, is necessary in accordance with the invention illustrated in FIG. 33.

The present invention therefore provides both an optical separator device as well as an optical combiner device which can be employed in a number of unique implementations. The composite dichroic layer devices of the present invention can be employed in a number of different ways with a wide range of variables to produce the desired results and optical quality. The present invention is capable of inexpensively combining or separating individual substantially parallel spectral beams which eliminates many of the problems involved with alignment of components. Additionally, construction techniques of the optical component are greatly simplified over prior art devices, such as dichroic prisms, allowing for an optical component capable of producing comparable or better optical quality at only a fraction of the cost of dichroic prisms.

The foregoing description of the invention has been presented for purposes of illustration and description. It is not intended to be exhaustive or to limit the invention to precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

claim:

1. An optical device for spatially and spectrally combining a plurality of optical beams having different spectral ranges and spatially separated optical axes comprising:
    first dichroic layer means disposed along a first plane to reflect a first optical beam of said plurality of optical beams having at least one first predetermined spectral range and a first optical axis such that said first optical axis is aligned with a predetermined optical axis;
    a plurality of additional dichroic layer means disposed along additional planes parallel to said first plane to reflect additional optical beams of said plurality of optical beams having additional predetermined spectral ranges and additional optical axes to cause said additional optical axes to be aligned with said predetermined optical axis.

2. An optical device for spatially and spectrally combining a plurality of optical beams having substantially parallel optical axes spaced by predetermined optical axes distances and predetermined spectral ranges comprising:
    first dichroic layer means disposed along a plurality of parallel planes that are spaced by predetermined parallel plane distances and oriented at a first predetermined angle to said substantially parallel optical axes to reflect said plurality of optical beams from said plurality of parallel planes in accordance with said predetermined spectral ranges of said plurality of optical beams to control said predetermined optical axes distances and optical path lengths of said optical beams along said optical axes;
    second dichroic layer means disposed along a plurality of additional parallel planes that are spaced by additional predetermined parallel plane distances and oriented at a second predetermined angle to said optical beams reflected from said first dichroic layer means to substantially align said optical axes of said plurality of optical beams along a single combined output axis so that said optical path lengths of said optical beams are substantially equal and said plurality of optical beams are spatially and spectrally combined into a single combined output beam.

3. An optical device for spatially and spectrally combining a plurality of optical beams having predetermined spectral ranges into a single combined output beam such that the optical axes of said plurality of optical beams remain substantially parallel and have substantially equal optical path lengths, said device comprising:
first composite dichroic means for reflecting said plurality of optical beams such that path lengths of each of said optical axes of said plurality of optical beams are altered by a predetermined amount;
second composite dichroic means for reflecting said plurality of optical beams reflected from said first composite dichroic means into a spatially superimposed path such that path lengths of each of said optical axes of said plurality of optical beams is restored by said predetermined amount to produce equal optical path lengths for each of said optical axes of said plurality of optical beams and each of said plurality of optical beams is spatially and spectrally superimposed to form said single combined output beam.

4. The optical device of claim 3 wherein said plurality of optical beams comprise beams imaged from point sources.

5. The optical device of claim 3 wherein said plurality of optical beams comprise beams imaged from line sources.

6. The optical device of claim 3 wherein said plurality of optical beams comprise beams imaged from two-dimensional area sources.

7. The optical device of claim 6 wherein said area beams comprise image beams.

8. The optical device of claim 3 wherein said plurality of optical beams intersect said first and second composite dichroic means at substantially equal incidence angles.

9. The optical device of claim 8 wherein said plurality of optical beams intersect said first and second composite dichroic means at an angle of incidence of approximately 22.5 degrees.

10. The optical device of claim 3 wherein said plurality of optical beams intersect said first and second composite dichroic means at different incidence angles.

11. The optical device of claim 3 wherein said first and second composite dichroic means comprise:
optical spacer means for providing a substantially optically transparent medium having a predetermined thickness;
first dichroic layer means disposed on a first side of said optical spacer means for reflecting light having at least one first predetermined spectral range and transmitting light outside of said first predetermined spectral range;
second dichroic layer means disposed on a second side of said optical spacer means for reflecting light having at least one second predetermined spectral range and transmitting light outside of said second predetermined spectral range;
reflector means disposed a predetermined distance from, and essentially parallel to, said optical spacer means for reflecting light transmitted by said first dichroic layer means and said second dichroic layer means.

12. The optical device of claim 11 wherein said predetermined thickness of said optical spacer means is such that said optical spacer means has an air equivalent path that is substantially equal to the air equivalent path length between said reflector means and said optical spacer means.

13. The optical device of claim 11 further comprising optical gluing means disposed between said reflector means and said optical spacer means, for securing said optical spacer means in a position substantially parallel to said reflector means.

14. The optical device of claim 11 wherein said optical gluing means has an index of refraction essentially equal to the index of refraction of said optical spacer means.

15. The optical device of claim 11 wherein said predetermined distance between said reflector means and said optical spacer means is inversely proportional to the index of refraction of said optical spacer means and proportional to the index of refraction of a substance filling the space between said reflector means and said optical spacer means multiplied by the thickness of said optical spacer means.

16. The optical device of claim 11 wherein the angle of incidence of said plurality of optical beams with said first and second composite dichroic means are different, and said predetermined thickness of said optical spacer means and said predetermined distance between said optical spacer means and said reflector means for said first composite dichroic means is different than said predetermined thickness of said optical spacer means and said predetermined distance between said optical spacer means and said reflector means for said second composite dichroic means.

17. The optical device of claim 11 further comprising separator means disposed between said reflector means and said optical spacer means for precisely locating said optical spacer means said predetermined distance from, and essentially parallel to, said reflector means.

18. The optical device of claim 3 wherein said first and second composite dichroic means comprises:
first dichroic layer means supported by substantially optically transparent support means for reflecting light from said input optical beam having at least one first predetermined spectral range and transmitting light outside of said first predetermined spectral range;
at least one additional dichroic layer means supported by at least one additional substantially optically transparent support means for reflecting light having at least one additional predetermined spectral range and transmitting light outside of said at least one additional predetermined spectral range.

19. The optical device of claim 18 wherein said first and second composite dichroic means further comprises:
reflector means disposed to reflect light transmitted by said additional dichroic layer means.

20. The optical device of claim 3 wherein said first and second composite dichroic means comprise:

substantially optically transparent support means for providing a substantially optically transparent support medium;

dichroic layer means disposed on said substantially optically transparent support means for reflecting light from within predetermined spectral ranges and transmitting light outside of said predetermined spectral ranges.

21. The optical device of claim 20 wherein said first and second composite dichroic means further comprise:

optical spacer means for providing substantially optically transparent media having predetermined thicknesses;

dichroic layer means disposed on two surfaces of said optical spacer means for reflecting light having predetermined spectral ranges and transmitting light outside of said predetermined spectral ranges.

22. The optical device of claim 3 wherein said first and second composite dichroic means comprise:

optical spacer means for providing substantially optically transparent media having predetermined thicknesses;

dichroic layer means disposed on two substantially parallel surfaces of said optical spacer means for reflecting light having predetermined spectral ranges and transmitting light outside of said predetermined spectral ranges.

23. A color imaging device for generating a color image on an image plane in response to an electronic imaging signal comprising:

color generator means for generating a plurality of optical beams such that each of said optical beams is spatially separated and has a predetermined spectral range;

intensity control means for varying the intensity each of said plurality of optical beams in accordance with said electronic imaging signal to produce a plurality of optical imaging beams;

spectral combiner means disposed between said intensity control means and said image plane for spatially and spectrally combining said plurality of optical imaging beams into a single combined output beam such that optical axes of said plurality of optical imaging beams remain substantially parallel and have substantially equal optical path lengths comprising:

first composite dichroic means for reflecting said plurality of optical imaging beams such that said optical axes have predetermined path lengths;

second composite dichroic means for reflecting said plurality of optical imaging beams reflected from said first composite dichroic means into a spatially superimposed path such that said optical axes have substantially equal optical path lengths and each of said plurality of optical beams is spatially and spectrally superimposed to form said single combined output beam.

24. The color imaging device of claim 23 further comprising:

means for focusing said single combined output beam on said imaging plane to form a color image.

25. The color imaging device of claim 23 wherein said color generator means and said intensity control means comprises a plurality of linear arrays of light emitting diodes.

26. The color imaging device of claim 23 wherein said intensity control means comprises liquid crystal display shutter means for controlling the intensity of said plurality of optical beams.

27. The color imaging device of claim 23 wherein said intensity control means comprises means for controlling the intensity of a plurality of matrix arrays of light emitting diodes.

28. The color imaging device of claim 23 wherein said intensity control means comprises liquid crystal display shutter means formed in a matrix array.

29. The color imaging device of claim 23 wherein said electronic imaging signal comprises a video signal and said means for focusing comprises projection lens means for projecting a video image onto a video projection screen.

30. The color imaging device of claim 23 wherein said electronic imaging signal comprises a document scan signal.

31. The color imaging device of claim 23 further comprising:

means for recording said single combined output beam.

32. The color imaging device of claim 31 wherein said means for recording comprises photographic film.

33. The color imaging device of claim 31 wherein said means for recording comprises a light sensitive color recording document.

34. The color imaging device of claim 30 further comprising:

means for recording said single combined output beam to form a color document.

35. The color imaging device of claim 31 wherein said color generator means comprises a plurality of colored lasers.

36. A color image detector device for generating a color electronic image signal representative of a color image formed from an image beam focused on an imaging plane comprising:

imaging means for focusing said color image beam on said imaging plane;

spectral separator means disposed between said imaging means and said imaging plane for spatially and spectrally separating said color image beam into plurality of optical beams such that each of said plurality of optical beams has a predetermined spectral range and optical axes that have optical path lengths that are substantially equal to said imaging plane, said spectral separator means comprising:

composite dichroic means for spatially and spectrally separating said color image beam into said plurality of optical beams so that each of said plurality of optical beams has a predetermined spectral range and said optical axes are substantially parallel;

area array detector means aligned with each of said plurality of optical beams on said imaging plane for generating a separate color electronic image signal for each of said plurality of optical beams.

37. The color image detector of claim 36 further comprising:

additional composite dichroic means for equalizing said optical path lengths of said optical axes of each of said plurality of optical beams to said imagine plane.

38. The color image detector device of claim 37 wherein said area array detector means comprises photodetector matrix array means.

39. The color image detector device of claim 37 wherein said photo-detector matrix array means comprises CCD arrays.

40. An electronic color filter device for filtering an input optical beam comprising:
   means for focusing said input optical beam on an aperture plane;
   spectral separator means disposed between said means for focusing and said aperture plane for spatially and spectrally separating said input optical beam into a plurality of optical beams such that each of said plurality of optical beams has a predetermined spectral range and optical axes that are substantially parallel and that have optical path lengths that are substantially equal;
   aperture means disposed on said aperture plane and aligned with said plurality of optical beams focused on said aperture plane for separately controlling transmission intensity of said each of said plurality of optical beams in response to an electrical filter control signal.

41. The electronic color filter device of claim 40 further comprising:
   spectral combiner means for spatially and spectrally combining said plurality of optical beams into a single combined output beam having a predetermined single optical axis such that said optical axes of said plurality of optical beams have substantially equal optical path lengths and are substantially aligned with said single optical axis to form said single combined output beam;
   means for focusing said single combined output beam.

42. A multiple channel fiber optic communication device comprising:
   optical generator means for generating a plurality of optical beams such that each of said optical beams has a predetermined spectral range;
   means for individually varying the intensity of each of said plurality of optical beams such that each of said plurality of optical beams is a separate communication channel in said multiple channel fiber optic communication device;
   spectral combiner means for spatially and spectrally combining said plurality of optical beams into a single combined beam;
   fiber optic transmission means for transmitting said single combined beam;
   spectral separator means for spatially and spectrally separating said single combined beam that has been transmitted through said fiber optic transmission means to obtain said plurality of optical beams by reflecting said plurality of optical beams from a plurality of spatially separated and substantially parallel dichroic layers;
   detector means aligned with each of said plurality of optical beams for sensing variations in intensity of each of said plurality of optical beams.

43. The multiple channel fiber optic communication device of claim 42 wherein said spectral combiner means comprises a lens.

44. The multiple channel fiber optic communication device of claim 42 wherein said spectral combiner means comprises dichroic composite means having a predetermined spatial separation for reflecting said plurality of optical beams to cause said plurality of optical beams to be spatially and spectrally superimposed to form said single combined beam.

45. The multiple channel fiber optic communication device of claim 42 wherein said means for individually varying comprises liquid crystal display shutter means for varying the intensity of each of said plurality of optical beams individually.

46. The multiple channel fiber optic communication device of claim 42 wherein said optical generator means comprises solid state optical emitters.

47. The multiple channel fiber optic communication device of claim 46 wherein said means for individually varying the intensity of said plurality of optical means comprises control signal means for varying the intensity of said solid state emitters.

48. An optical device for spatially and spectrally separating a single optical beam into a plurality of optical beams having different spectral ranges and spatially separated optical axes comprising:
   first dichroic layer means disposed along a first plane to reflect a first optical beam from said single optical beam, said first optical beam having at least one first predetermined spectral range and a first optical axis;
   a plurality of additional dichroic layer means disposed along additional planes substantially parallel to said first plane to reflect additional optical beams of said plurality of optical beams from said single optical beam, said additional optical beams having additional predetermined spectral ranges and additional optical axes that are spatially separated from each other and said first optical axis by an amount that is proportional to the distance between said planes and the angle of incidence of said single optical beam with said first dichroic layer means and said plurality of additional dichroic layer means.

* * * * *